(12) United States Patent
Toh et al.

(10) Patent No.: US 7,596,689 B2
(45) Date of Patent: Sep. 29, 2009

(54) SECURE AND RELIABLE DOCUMENT DELIVERY USING ROUTING LISTS

(75) Inventors: Eng-Whatt Toh, Singapore (SG); Kok-Hoon Teo, Singapore (SG)

(73) Assignee: Perimeter eSecurity, Milford, CT (US)

( * ) Notice: Subject to any disclaimer, the term of this patent is extended or adjusted under 35 U.S.C. 154(b) by 0 days.

(21) Appl. No.: 11/878,964

(22) Filed: Jul. 30, 2007

(65) Prior Publication Data

US 2007/0294533 A1     Dec. 20, 2007

Related U.S. Application Data

(63) Continuation of application No. 10/004,019, filed on Oct. 18, 2001, now Pat. No. 7,251,728, and a continuation-in-part of application No. 09/887,157, filed on Jun. 21, 2001, now Pat. No. 6,988,199.

(60) Provisional application No. 60/242,013, filed on Oct. 19, 2000, provisional application No. 60/216,734, filed on Jul. 7, 2000, provisional application No. 60/242,015, filed on Oct. 19, 2000, provisional application No. 60/242,014, filed on Oct. 19, 2000.

(51) Int. Cl.
*H04L 9/00* (2006.01)
*H04L 9/30* (2006.01)
*G06F 15/16* (2006.01)
*H04K 1/00* (2006.01)

(52) U.S. Cl. ............ 713/150; 713/156; 713/178; 380/30; 709/205

(58) Field of Classification Search ............ 713/150, 713/168, 156; 380/286; 709/220, 223, 229
See application file for complete search history.

(56) References Cited

U.S. PATENT DOCUMENTS

| | | | |
|---|---|---|---|
| 5,303,361 A | 4/1994 | Colwell et al. | |
| 5,606,609 A | 2/1997 | Houser et al. | |
| 5,864,683 A | 1/1999 | Boebert et al. | |
| 5,864,870 A | 1/1999 | Guck | |
| 5,872,848 A | 2/1999 | Romney et al. | |
| 5,878,398 A | 3/1999 | Tokuda et al. | |
| 5,883,956 A | 3/1999 | Le et al. | |
| 5,898,156 A | 4/1999 | Wilfong | |
| 5,903,882 A | 5/1999 | Asay et al. | |
| 5,912,974 A | 6/1999 | Holloway et al. | |
| 5,915,024 A | 6/1999 | Kitaori et al. | |
| 5,920,630 A | 7/1999 | Wertheimer et al. | |
| 5,982,506 A * | 11/1999 | Kara ..................... | 358/405 |

(Continued)

OTHER PUBLICATIONS

U.S. Appl. No. 09/881,899, filed Sep. 26, 2005; Eng Whatt Toh, Amendment to Official Action of Mar. 25, 2005.

(Continued)

*Primary Examiner*—Shin-Hon Chen
(74) *Attorney, Agent, or Firm*—Merek, Blackmon & Voorhees, LLC

(57) ABSTRACT

An operations center (OC) (200) acts as an intermediary for securely and reliably transmitting a document (3) from a sender (100) to a next recipient (300) on a routing list. The OC (200) identifies (464) a recipient (300) from the next stage of the routing list and provides either the recipient's public key (404) or an escrow encryption key (406). The OC (200) optionally can authenticate the sender (100) and/or the recipient (300), thus increasing security.

19 Claims, 12 Drawing Sheets

U.S. PATENT DOCUMENTS

| | | | |
|---|---|---|---|
| 5,987,140 | A | 11/1999 | Rowney et al. |
| 5,995,756 | A | 11/1999 | Herrmann |
| 6,026,416 | A | 2/2000 | Kanerva et al. |
| 6,044,462 | A * | 3/2000 | Zubeldia et al. ............. 713/158 |
| 6,064,848 | A | 5/2000 | Haneda |
| 6,073,142 | A * | 6/2000 | Geiger et al. ............... 715/205 |
| 6,112,305 | A | 8/2000 | Dancs et al. |
| 6,161,181 | A | 12/2000 | Haynes, III et al. |
| 6,192,130 | B1 | 2/2001 | Otway |
| 6,282,535 | B1 | 8/2001 | Pham et al. |
| 6,327,611 | B1 * | 12/2001 | Everingham ................ 709/206 |
| 6,338,140 | B1 | 1/2002 | Owens et al. |
| 6,397,261 | B1 | 5/2002 | Eldridge et al. |
| 6,446,207 | B1 | 9/2002 | Vanstone et al. |
| 6,493,825 | B1 | 12/2002 | Blumenau et al. |
| 6,549,935 | B1 | 4/2003 | Lapstun et al. |
| 6,564,320 | B1 | 5/2003 | de Silva et al. |
| 6,615,347 | B1 | 9/2003 | de Silva et al. |
| 6,636,838 | B1 | 10/2003 | Perlman et al. |
| 6,651,166 | B1 | 11/2003 | Smith et al. |
| 6,671,805 | B1 | 12/2003 | Brown et al. |
| 6,836,792 | B1 * | 12/2004 | Chen .......................... 709/220 |
| 6,988,199 | B2 | 1/2006 | Toh et al. |
| 7,171,000 | B1 | 1/2007 | Toh et al. |
| 2002/0023213 | A1 * | 2/2002 | Walker et al. ............... 713/168 |
| 2002/0091928 | A1 * | 7/2002 | Bouchard et al. ........... 713/178 |

OTHER PUBLICATIONS

U.S. Appl. No. 09/881,899: Eng Whatt Toh, Official Action of Dec. 30, 2005.
U.S. Appl. No. 09/881,899; Eng Whatt Toh, Jun. 30, 2006 Amendment to Official Action of Dec. 30, 2005.
U.S. Appl. No. 09/881,899; Chee-Hong Wong, Official Action of Sep. 21, 2006.
U.S. Appl. No. 09/887,157; Chee-Hong Wong, Official Action of Nov. 24, 2004.
U.S. Appl. No. 09/887,157; Eng Whatt Toh, Amendment to Official Action of Nov. 24, 2004.
U.S. Appl. No. 09/332,358; Eng Whatt Toh, Official Action of Jan. 14, 2003.
U.S. Appl. No. 09/332,358; Eng Whatt Toh, Jul. 21, 2003 Response to Official Action of Jan. 14, 2003.
U.S. Appl. No. 09/332,358; Eng Whatt Toh, Official Action of Sep. 25, 2003.
U.S. Appl. No. 09/332,358; Eng Whatt Toh, Mar. 24, 2004 Response to Official Action of Jan. 14, 2003.
U.S. Appl. No. 09/332,358; Eng Whatt Toh, Interview Summary of May 11, 2004.
U.S. Appl. No. 09/332,358; Eng Whatt Toh, Jun. 7, 2004 Draft claims to Examiner.
U.S. Appl. No. 09/332,358; Eng Whatt Toh, Jun. 7, 2004 Preliminary Amendment to Official Action of Official Action of Sep. 25, 2003.
U.S. Appl. No. 09/332,358; Eng Whatt Toh, Official Action of Jul. 23, 2004.
U.S. Appl. No. 09/332,358; Eng Whatt Toh, Dec. 23, 2004 Amendment to Official Action of Jul. 23, 2004.
U.S. Appl. No. 09/332,358; Eng Whatt Toh, Official Action of Aug. 11, 2005.
U.S. Appl. No. 09/332,358; Eng Whatt Toh, Official Action of May 16, 2006.
U.S. Appl. No. 09/332,358; Eng Whatt Toh, Mark-up copy for amendment filed with RCE of Aug. 16, 2006.

* cited by examiner

FIGURE 10A

Routing List Identifier: list1

Routing List Definition:

| Stage | Recipients | Rules |
|-------|------------|-------|
| 1 | A | None |
| 2 | B | None |
| 3 | C | None |
| 4 | D | None |

FIGURE 10B

Routing List Identifier: review.team@xyz.com

Routing List Definition:

| Stage | Recipients | Rules |
| --- | --- | --- |
| 1 | A | None |
| 2 | Group B | Route to all members in Group B after A has completed review |
| 3 | Group C | Route to corresponding Group C member after Group B member has completed review |
| 4 | D | Route to D only after all members in Group C have completed review |

FIGURE 10C

Routing List Identifier: newsales@routinglists.xyz.com

Routing List Definition:

| Stage | Recipients | Rules |
|---|---|---|
| 1 | Sales Mgr | Route to regional sales manager for the originating salesperson |
| 2 | Credit Dept | Route to credit dept representative for the corresponding sales region |
| 3 | VP and legal | Route only if amount is over $100,000 |
| 4 | Acct, ship | None |

SECURE AND RELIABLE DOCUMENT DELIVERY USING ROUTING LISTS

RELATED APPLICATIONS

This application claims priority under 35 U.S.C. § 119(e) to U.S. Provisional Patent Application Ser. No. 60/242,013, "Efficient Method for Routing Deliveries through Recipient Translation," by Eng-Whatt Toh, filed 19 Oct. 2000.

This application is a continuation-in-part of commonly assigned U.S. patent application Ser. No. 09/887,157, "Secure and Reliable Document Delivery," by Eng-Whatt Toh, et al., filed Jun. 21, 2001; which claims priority under 35 U.S.C. § 119(e) to U.S. Provisional Patent Application Ser. No. 60/216,734, "A VPN-Based Digital Delivery System," by Eng-Whatt Toh, filed 7 Jul. 2000, U.S. Provisional Patent Application Ser. No. 60/242,015, "Application VPN with Application Proxies," by Eng-Whatt Toh, filed 19 Oct. 2000; and U.S. Provisional Application Ser. No. 60/242,014, "Method For Fast Escrow Delivery," by Chee-Hong Wong, Kok-Hoon Teo, See-Wai Yip, and Eng-Whatt Toh, filed 19 Oct. 2000.

The subject matter of all of the foregoing is incorporated herein by reference in their entirety.

BACKGROUND OF THE INVENTION

1. Technical Field

This invention relates generally to secure and reliable transmission of data. More particularly, the invention relates to computer-implemented techniques for securely and reliably transmitting an electronic document along a routing list using a secure, central key managing intermediary.

2. Background Art

With the advent of computers and the Internet, an increasing number of documents is being transmitted in electronic format between an increasing number of recipients, and there is a growing acceptance of the electronic delivery of documents. For example, many companies transact business through the use of documents, such as contracts, memos, emails, etc. In order to transact business, these documents often are circulated for approval or review. As a result, it is becoming increasingly important to be able to deliver these documents in a secure and reliable manner. It is also becoming increasingly important for the delivery service to be flexible in order to handle more complex distribution and routing lists.

While unsecured email is perhaps one of the most common electronic delivery methods, it typically is not secure, flexible or particularly reliable. Other approaches to electronic delivery exist which are more successful in attempting to provide either secure or reliable delivery of documents. Two of the more common approaches are secure electronic mail (a.k.a., secure email) and Secure Socket Layer ("SSL") based deliveries using a Web site for uploading and downloading of deliveries. However, neither of these delivery methods is fully satisfactory with respect to security or reliability and generally is no better than unsecured email with respect to flexibility.

Secure email is similar to unsecured email, except that email messages are secured using encryption. In unsecured email, the sender transmits his message to the recipient in an unencrypted state. Thus, if a third party intercepts the message en route to the recipient, the third party will be able to read the message. In secure email, the sender first encrypts the message using a key and then transmits the encrypted message to the recipient. If a third party intercepts this message, it will be unintelligible to the third party since he presumably does not have enough information to decrypt the message (e.g., the third party normally does not have the correct key required to decrypt the message). The recipient, on the other hand, does have the information required to decrypt the message and therefore can read the message when he receives it. By limiting access to the decryption method and keys, the sender can limit who is able to read an encrypted message. By encrypting the message before transmitting, the message is protected during transmission.

However, secure email is delivered from the sender to the recipient using the same architecture and infrastructure as unsecured email and, therefore, suffers from many of the same drawbacks as unsecured email. For example, secure email delivery services generally lack reliability due to the architecture of the email delivery system and are limited to the same types of distribution as unsecured email. Conventional email servers are designed upon a store-and-forward architecture. An email message may be routed through several email servers on its way from the sender to the recipient, with each server receiving the incoming message, determining the next server on the message's journey, transmitting the message, and possibly leaving behind a copy causing unnecessary and unmanageable audit trails. No single machine is responsible for ensuring that the entire message has been successfully transmitted from the sender to the recipient. In addition, each of the email servers in the chain from sender to recipient is usually owned and operated by a different party. Since no single company or entity owns the entire delivery chain for the email message, no one company or entity can guarantee reliable delivery or integrity of the message. The storing-and-forwarding of email documents through several servers owned by multiple parties means that email messages get lost, delayed, and corrupted. This makes the overall delivery service unreliable or untrackable, and this is just in the context of a delivery from one sender to one recipient. These problems are aggravated if the document is to be routed among multiple recipients, for example along a routing list over the Internet. Encrypting an email message may provide some protection against unwanted disclosure during transit, but it does not address the reliability issue, does not guarantee that the message will be delivered to the recipient, and does not provide the flexibility to support more sophisticated routing lists with end to end tracking.

An alternate approach to document delivery services utilizes the Secure Socket Layer Protocol for security. In this approach, a Web site uses its digital certificate to authenticate itself to the sender using the SSL protocol. Once the Web site is authenticated, a secure channel is set up between the sender's browser and the Web site, typically by generating a session key to encrypt transmissions between the two. The document is sent from the sender's browser to the Web site via the secure channel. It is stored at the Web site, typically in unencrypted form, awaiting delivery to the recipient. During delivery, the Web site authenticates itself to the recipient's browser and a secure communications channel is then set up between the Web site and the recipient's browser. The document is delivered to the recipient via the secure channel.

The SSL approach suffers from many drawbacks. For example, although the Web site authenticates itself using its digital certificate, neither the sender nor the recipient authenticates himself using a digital certificate. Typically, these systems would at most require the sender and the recipient to authenticate themselves using passwords, which is weak security. In other words, there is no real assurance that either the sender or the recipient actually is who he claims to be. As a result, there is also a lack of non-repudiation, meaning that at a later time, the sender can plausibly deny having sent the document simply by pointing out that there is no strong evidence of who actually sent the document.

Another drawback is that these systems lack end-to-end security, because SSL secures only the channels. The document typically remains in unencrypted form while it is temporarily stored at the Web site. Hence, a third party which attacks the Web site and gains access to the document will be able to read the document. In addition, if the Web site is untrustworthy (or happens to hire an untrustworthy employee), the document will be vulnerable.

There are also SSL-based services that provide optional password encryption of the documents. These systems provide better security, since the document is encrypted at the point of transmission. However, these systems are difficult to use since they require the sender to communicate the password out-of-band to the recipient, a process that is cumbersome and fraught with security risks. Such a system also does not guarantee non-repudiation, since it neither strongly authenticates a user, nor supports digital signatures, nor ensures that only the recipient could open a delivery.

There are also SSL-based services that provide optional encryption of the documents using certificates. These systems provide end-to-end content security, but are extremely difficult to use because of the need for users to manually obtain the keys and exchange keys prior to encryption. Unfortunately, these systems do not integrate key management with encryption and reliable delivery, leaving the complexity of key management entirely to the user. In addition, a system that requires optional use of certificates cannot guarantee non-repudiation. The absence of a digital signature does not represent the absence of a transaction, because the sender could have opted to not use a certificate. Absolute non-repudiation requires mandatory and uniform use of certificates for all transactions in a system.

Finally, the SSL approach, like secure email delivery services, is typically focused on delivering documents from one sender to one recipient(s). As a result, more complex deliveries, such as those using routing lists, can be difficult to implement. For routing lists to be effectively implemented, deliveries should be tracked end to end. In this way, the progress of a delivery along the routing list can be tracked and the delivery can be correctly routed to the next recipient(s). Secure email services typically cannot implement end to end tracking for the reasons discussed above. In addition, to facilitate business-to-business routing of documents over a public network such as the Internet, strong security is often a requirement. SSL services typically cannot provide strong security. Neither the SSL approach nor the secure e-mail approach currently provides sufficient security and reliability to facilitate a robust implementation of routing lists over public networks.

In contrast, existing workflow systems can facilitate the routing of documents between various recipients but they typically are limited to internal communications and cannot be used securely or reliably to communicate with the outside world. Typically, a workflow server stores a document online and decides who should get the document next and notifies the next recipient to come and get it. One example of such a workflow system is Lotus Notes, in which documents and forms are database driven and the next recipient is notified once certain prior conditions, as determined by a central server, are met. These systems typically require that all of the recipients have access to a common database or common software. However, companies are reluctant to store their documents in databases which are widely accessible from the outside due to security concerns. Alternatively, the routing rules can be embedded as part of the delivery but proprietary software is required to decipher and execute the embedded rules. This approach is not suitable for use between different companies because companies typically are not willing to install common software just to facilitate workflow with one of its business partners. Thus, in practice, current workflow systems are confined to well-defined, closed communities.

Therefore, there is a need for a flexible delivery system which provides integrated key management so that reliable delivery and end-to-end security can be achieved, thus providing some or all of the following benefits: (1) reliable/guaranteed delivery for transactions—a delivery will not be lost; (2) confidentiality for transactions—only the recipient can open a delivery; (3) non-repudiation for transactions; and (4) complex routing of transactions among multiple recipients, including over the Internet between different organizations.

DISCLOSURE OF INVENTION

A computer-implemented method, system, and computer-readable medium for securely and reliably transmitting a document (3) from a sender (100) to a next recipient (300) on a routing list using a central operations center ("OC") (200). The OC (200) receives (462) an indication that the sender (100) desires to deliver the document (3) to a next stage on a routing list for the document. The OC (200) identifies (464) a recipient (300) from the next stage of the routing list and provides a key, either the recipient's public key (404) or an escrow encryption key (406). The OC (200) optionally can authenticate the sender (100) and/or the recipient (300) using their respective public keys, thus increasing security.

In one implementation, the key (404,406) is transmitted (485) to the sender (100). For example, if the key is the recipient's public key (404), it may be transmitted in the form of a digital certificate. The sender (100) encrypts (490) the document (3) using the key (404,406) and transmits the encrypted document to the recipient (300), either directly (630) or indirectly (530) via the OC (200). In an alternate embodiment, the OC (200) encrypts the document using the key (404,406).

The routing list may also be implemented in many ways. In one implementation, the routing list is identified by a special email address or domain name. Documents which are delivered to the email address or domain name are interpreted as using a routing list. In another variation, the routing list includes rules, for example rules which implement a business process or which determine who the next recipient is. In these cases, some of the recipients may be conditional recipients, meaning that they will be on the routing list only if certain conditions are met.

In one implementation, the OC (200) tracks the current recipient of the routing list. The tracking is updated as the document is routed to different recipients. For example, the OC (200) may wait for confirmation that the next recipient on the routing list has received the document before updating its tracking.

One advantage of using a central OC (200) is that secure, reliable delivery of documents can be made in a more efficient manner. For example, the OC (200) can form secure, reliable connections with both the sender (100) and the recipient (300), thus effectively generating a communications channel from the sender (100) to the recipient (300) but without requiring that each possible sender (100) connect to each possible recipient (300). The use of routing lists supports more complex distribution paths for a document, and the central OC (200) can efficiently track the document as it is routed along the routing list.

BRIEF DESCRIPTION OF THE DRAWINGS

These and other more detailed and specific objects and features of the present invention are more fully disclosed in the following specification, reference being had to the accompanying drawings, in which:

FIGS. 10A-10C are tables illustrating examples of routing lists.

DETAILED DESCRIPTION OF THE PREFERRED EMBODIMENTS

Figure 1:
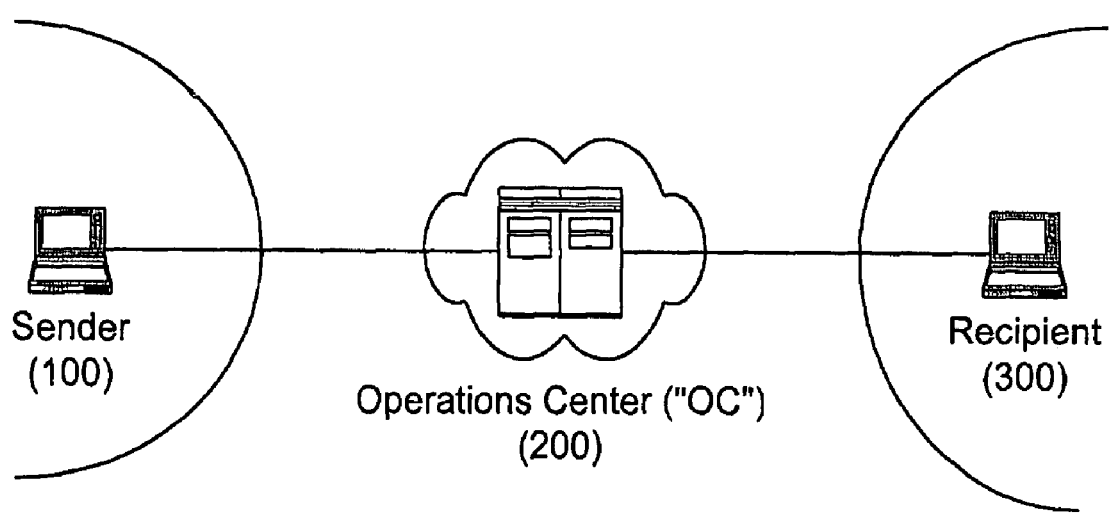
FIG. 1 is a schematic representation of a sender (100) delivering a document to a next recipient (300) on a routing list via a single-node Operations Center (200)

Before turning to the Figures, it is instructive to review some principles of cryptography. Cryptographic algorithms can generally be divided into two classes: symmetric key cryptography and asymmetric key cryptography. The keys themselves are typically large numbers derived from complex mathematical algorithms. These keys are used to encrypt and/or decrypt a message.

Symmetric key cryptography uses a single key to both encrypt and decrypt a message. A message encrypted with a symmetric key can, for all practical purposes, be decrypted only by that same key. For example, if a sender encrypts a message with a symmetric key and sends the encrypted message to a recipient, the recipient can decrypt the message only if he possesses the same key that the sender used to encrypt the message. One of the benefits of using symmetric keys is efficiency. The amount of computing (and therefore, the amount of time) necessary for encrypting and decrypting the message is less than that required for other encryption methods. Thus, the delay experienced by the sender and recipient during the encryption and decryption processes may be minimized.

Asymmetric key encryption, also called public-key encryption, involves a pair of keys—a public key and a private key. Once a user has generated a key pair, the user typically keeps the private key secret but publishes the corresponding public key. The public key and the private key are mathematically related so that one key can decrypt a message encrypted by the other key. However, the mathematical relationship between the keys is sufficiently complex that it is computationally infeasible to derive one key given the other. Thus, if a sender wants to send a message to a recipient in a manner such that only the recipient can read the message, the sender can encrypt the message with the recipient's public key. Since only the recipient's private key can decrypt the message, the sender can be assured that only the recipient can read the message, assuming that the recipient is the only one with access to his private key.

In addition to encrypting messages so that only specific individuals can decrypt the messages, public-key encryption can also be used for other important purposes. For example, public-key encryption allows the recipient of a document to verify the identity of the sender. Assuming that a document is encrypted using the sender's private key, it can be decrypted only by the corresponding public key. Thus, if a recipient can decrypt a document using a certain person's public key, he can be assured that the document was originally encrypted using the corresponding private key. Thus, the recipient can be assured that the certain person was the one sending the document. In other words, the document has been digitally signed by the sender.

However, for this identification to be effective, the recipient must receive the sender's public key in a manner in which the recipient trusts that the key is in fact the sender's public key and not someone else's public key. This trusted transmission of the sender's public key can occur in several ways. For example, the sender could personally give the public key to the recipient. Alternatively, the sender could deliver the public key via a trusted delivery service.

Another possible method is to link the sender to his public key by a digital certificate issued by a trusted third party. A digital certificate is a document that identifies a certain public key as belonging to a certain entity, such as individuals, legal entities, Web servers, and the like, in a trustworthy manner. A trusted third party, known as a certificate authority or CA, typically issues a digital certificate. The CA issues a certificate that identifies, among other things, an entity and that entity's public key. In this manner, the CA acts like a notary, attesting that a certain key belongs to a certain entity. A recipient who trusts the CA can be assured that any message decrypted with that public key must have been encrypted with the corresponding private key, and if only the sender has access to that private key, the recipient knows that the sender sent the message.

Figure 2:
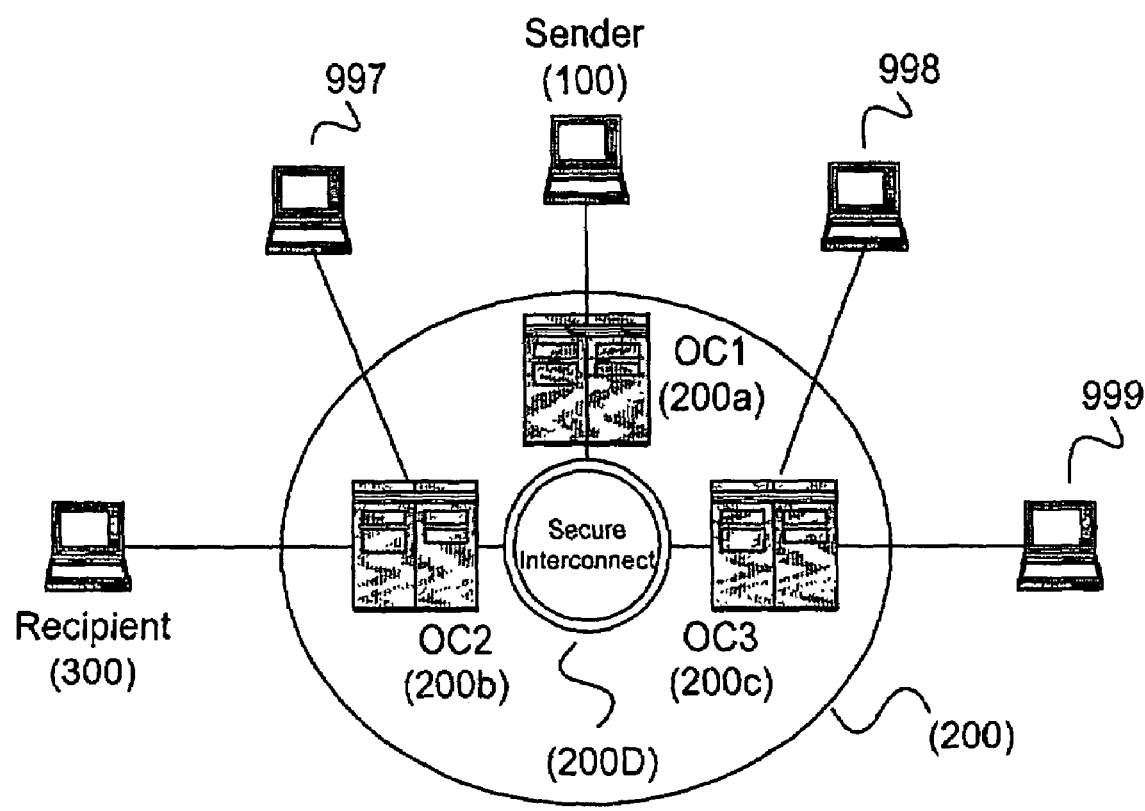
FIG. 2 is a schematic representation of a sender (100) delivering a document to a next recipient (300) on a routing list via a multiple-node Operations Centers (200)

Turning now to the Figures, FIGS. 1 and 2 are schematic representations of systems according to the invention. The systems include a sender 100, Operations Center ("OC") 200 and a recipient 300. The sender 100 wishes to deliver a document, which can be any type of data or electronic file, in a secure and reliable manner to the next recipient 300 on a routing list for the document. The sender 100 may or may not know the actual identity of recipient 300. In many cases, the sender 100 simply desires to deliver the document to whomever happens to be next on the routing list for the document. The OC 200 acts as a secure intermediary to facilitate the delivery of the document. It will be noted that "sender" 100 can usually be interchanged for "sending system" 100 and that "recipient" 300 can usually be interchanged for "receiving system" 300. Sender 100 and recipient 300 can represent individuals and entities. It will also be noted that there may be a one-to-one, one-to-many, and many-to-one relationship between sender 100 and sending system 100 and between recipient 300 and receiving system 300.

In FIG. 1, the OC 200 includes a single node, which connects to both the sending system 100 and the receiving system 300. In FIG. 2, the OC 200 includes multiple nodes 200A-C networked together by a secure interconnection 200D. The sender 100 connects to a node (200A in this example), and the recipient 300 also connects to a node (200B in this example). As the number of senders and recipients (i.e., the client base) increases, multiple nodes can distribute the tasks described below to better serve the clients. For example, senders and recipients can connect to the node that is most convenient for them. In the multi-node configuration, each node is securely connected 200D to the others to ensure the security and reliability of transmissions between the nodes. For convenience, the following explanations refer to a single-node OC but they are equally applicable to multi-node OCs.

Figure 3:
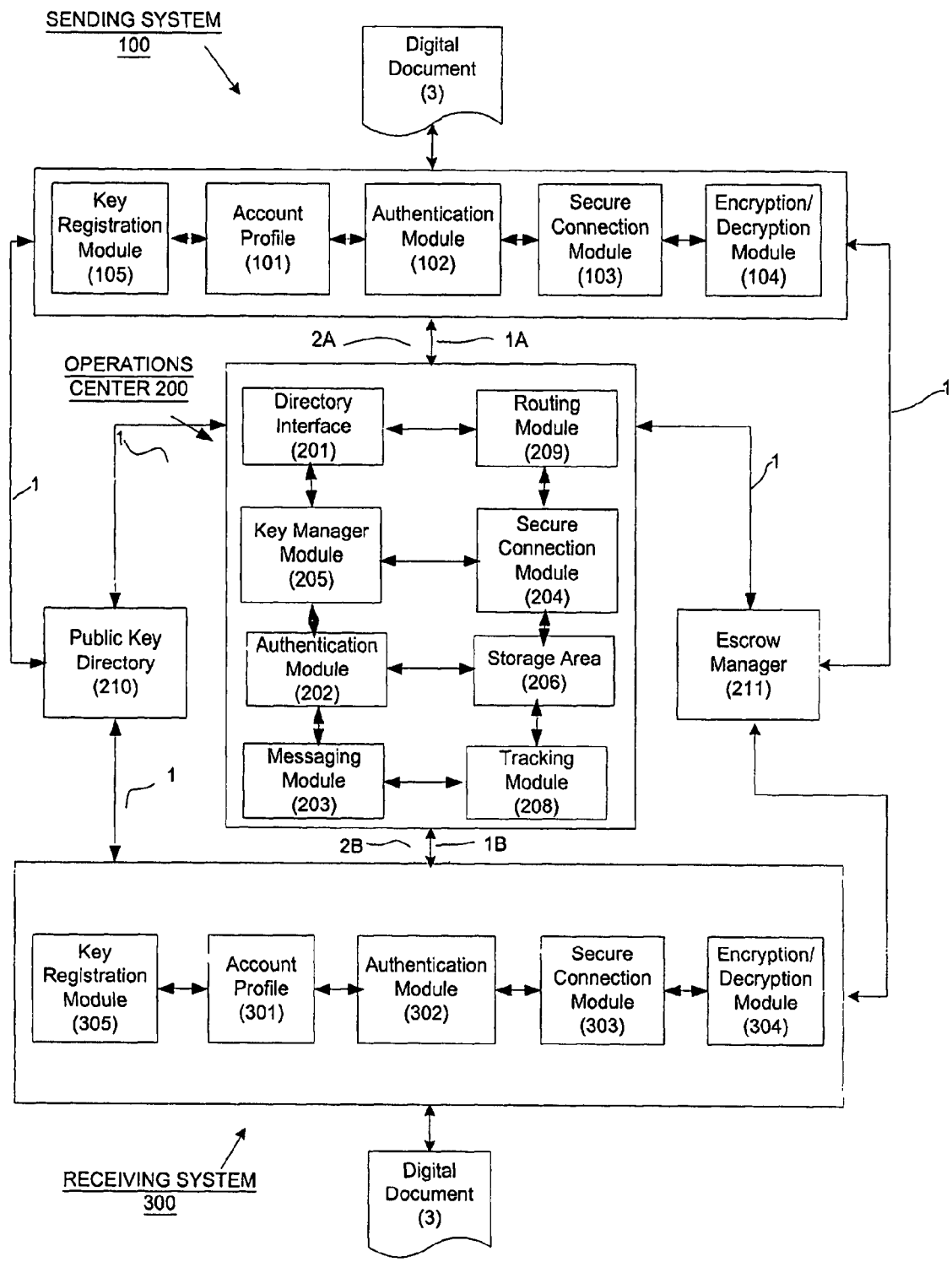
FIG. 3 is a functional block diagram of a preferred embodiment of the system shown in FIG. 1.

FIG. 3 is a functional block diagram of a preferred embodiment of the system shown in FIG. 1. In this embodiment, each of the sending system 100 and the receiving system 300 includes an account profile 101, 301, authentication module 102, 302, secure connection module 103, 303 and encryption/decryption module 104, 304, all of which may communicate with each other. In a preferred embodiment, each of the modules is implemented as software, but can also be implemented as hardware and/or firmware, and the account profile 101, 301 is stored locally. Examples of sending and receiving systems 100, 300 include desktop computers, portables, PDAs and wireless phones and other digital devices. The systems 100, 300 can also include a key registration module 105, 305 for registration of the sender 100 and the recipient 300 and for generating new key pairs as part of the key management performed by the OC 200.

The OC 200 includes the following modules: authentication module 202, messaging module 203, secure connection module 204, key manager module 205, tracking module 208, and routing module 209. It also includes a directory interface 201 and local storage 206. All of these components may communicate with each other. In a preferred embodiment, the various modules and the directory interface are implemented as software, but can also be implemented as hardware and/or firmware. For example, in one embodiment, the directory interface 201 and routing module 209 are implemented as software running on a separate computer from the other modules. An example implementation of OC 200 would include server software running on Windows NT and Sun Solaris systems.

The system in FIG. 3 also includes a public key directory 210 and an escrow manager 211, which is potentially accessible by each of the sending system 100, the OC 200, and the receiving system 300. The public key directory 210 is a directory of public keys. For example, the public key directory 210 may contain digital certificates which associate public keys to entities. The escrow manager 211 will be described in further detail below.

The system in FIG. 3 generally operates according to the flow charts in FIG. 4-FIG. 8. However, more details will be given below concerning various aspects of the system and its operation.

Figure 8:
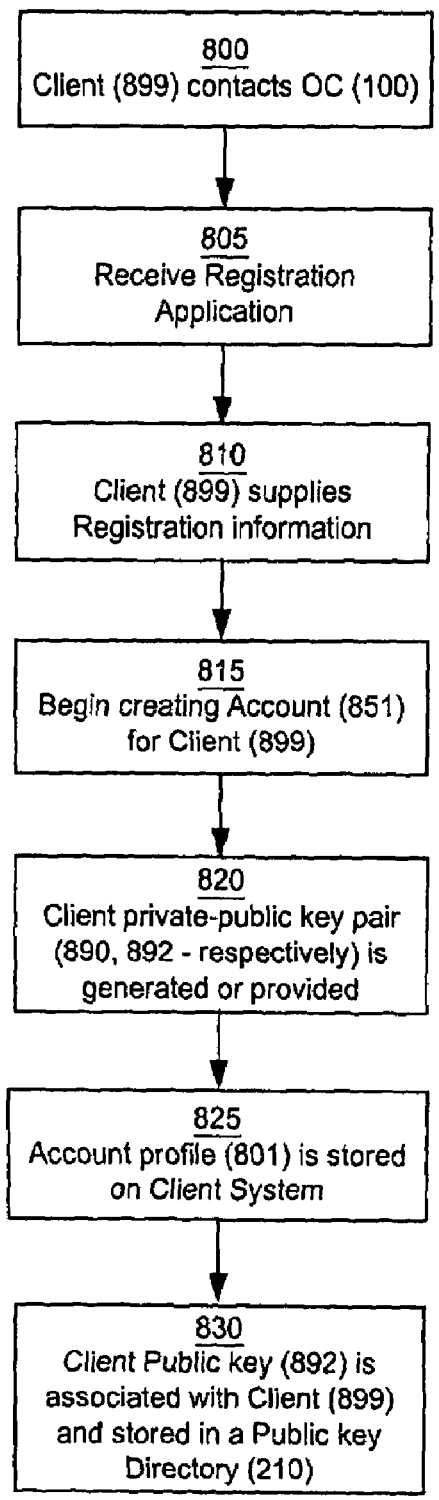
FIG. 8 is a flow diagram illustrating the registration of a client (899) with the OC (200)

Referring to FIG. 8, before a client 899, which could represent either the sender 100 or the recipient 300, can transmit or receive a document through the OC 200, the client 899 first registers with the OC 200. As described in more detail below, the registration process provides the client 899 with an application, which facilitates registration by associating a private-public key pair with the client 899 and by providing the client 899 with the sending system 100 and/or the receiving system 300. As shown in FIG. 3, many of the modules in the sending and receiving systems 100,300 are common and preferably are shared rather than duplicated.

An unregistered client 899 begins the registration process by contacting 800 the OC 200 and obtaining 805 the relevant application. The application can be implemented in software, firmware, hardware, or any combination thereof. In one embodiment, the client 899 contacts the OC 200 via a network connection to a server or Web site operated by the OC 200. Once connected to a Web site operated by the OC 200, the client 899 begins the registration process by selecting a "registration" or "new users" icon or hyperlink. In alternate embodiments, the client 899 could contact the OC 200 by telephone, facsimile, email, or mail and request that the relevant application be sent to the client 899. For example, upon receiving 805 a software application, the client 899 loads the software application onto a personal computer, such as an IBM® PC-compatible personal computer, or a workstation, such as those available from Sun Microsystems® of Mountain View, Calif.

In either of the above embodiments, the client 899 supplies 810 registration information, such as his name and a valid email address, to the OC 200 via a network connection. To protect the information that is supplied during this initial registration process, it is preferred that the connection between the OC 200 and client be secured. The connection can be secured by using a direct network connection or by using a security protocol, such as the Secure Socket Layer protocol. In one embodiment, once the registration information has been submitted to the OC 200, the OC 200 sends a personal activation code to the client 899. For example, the personal activation code is sent in an email message to the email address specified in the registration information. Only the individual with access to that email address will normally receive the personal activation code. The activation code could be a set of characters that the client 899 is required to enter at a specified Web page located at the Web site operated by the OC 200. Alternatively, the activation code could be a unique hyperlink, such as a Uniform Resource Locator ("URL"), that when selected by client 899, causes the client's computer to connect to a unique Web page at the Web site operated by the OC 200. For added security, after the activation code has been entered once, or after the hyperlink has been selected once, the OC 200 no longer accepts that activation code. Alternatively, in addition to the activation code, the activation process may also require the client 899 to provide a shared secret, something only the client 899 and the OC 200 know, further increasing the level of security for the activation process.

In yet a different embodiment, the client 899 may have received 540 (FIG. 5) notification that a delivery is pending, and the activation code could be sent together with the notification, removing the need to submit a Web form to request for the activation code. This method also effectively verifies the email address of the client 899.

After the client 899 has established a network connection to the OC 200 and the activation code, and optionally a shared secret, has been properly supplied, the OC 200 continues the registration process by creating 815 an account 851 for the client 899. To create the account, the OC 200 links the unique activation code to the client's previously supplied registration information. The client 899 is prompted to select and enter an account name and password. Once the client 899 has entered an account name and password, a private-public key pair (890,892, respectively) is generated 820. Alternatively, the client 899 may have an existing key pair which could be used instead of generating a new pair. The public key is added to the client's account information. The account 851 includes the client's registration information, a registered email address, and a public key for the client 899, which will be used to send and receive messages and for client authentication through the OC 200.

In one embodiment, the private-public key pair 890, 892 is generated by the OC 200 and communicated to the client 899. In an alternate embodiment, the private-public key pair 890, 892 is generated at the client's computer. In the latter embodiment, the key generating application can be part of the application received by the client 899. For example, the key generation modules 105, 305 can be included as part of the sending and receiving systems 100, 300. It is preferred that the key pair be generated by the client 899 because it eliminates the need to transmit the client's private key 890. Because the private key 890 is never transmitted, a third party cannot intercept it. In this case, only the public key 892 is transmitted to the OC 200. In either embodiment, the client's private key 890 is stored 825 on the client's computer in an account profile file 801 (such as account profile 101, 301 in FIG. 3).

To provide additional security, the client's private key 890 stored in the account profile 801 can be further encrypted. For example, the client's password could be used to encrypt the private key. By encrypting the private key 890 stored on the client's computer, anyone who gains physical access to the client's computer cannot access the client's private key 890 without first entering the correct account name and password.

When the OC 200 obtains the client's public key, it associates the client's public key 892 with the client's account 851, for example, by storing the public key 892 in the client's account 851 file. The OC can also optionally store 830 this associated information in a database or directory 210. Alternatively, the OC 200 can cause a digital certificate, which associates the client's information with the client's public key 892, to be created. The OC 200 could act as the certificate authority ("CA") creating the digital certificate; or, alternatively, the OC 200 could employ a trusted third-party CA to generate the digital certificate. Under either embodiment, the digital certificate can be created as part of the registration processes and therefore is transparent to the client. The public key or digital certificate is stored 830 in a database or directory 210 and referenced when needed, as described below, to authenticate the client 899 or as part of the secure document (3) transmission process.

As described above, the client's account profile 801, which contains the client's private key 890, is preferably generated and stored 825 on the client's computer. Without more, the client 899 can utilize the delivery service from only that computer. Some clients may wish to access the delivery service from multiple computers 997, 998, 999 (FIG. 2). In one embodiment, to allow clients a simple method to access the delivery service from multiple computers 997, 998, 999, the client need only copy the account profile to the additional computers or workstations 997, 998, 999. For example, the client 899 could copy the account profile 801 on to a floppy disk or other computer readable medium or smart cards, and then load that account profile 801 onto any additional computer or workstations 997, 998, 999 from which the client 899 wishes to access the OC 200.

In one embodiment, the public key and/or certificate directory 210 is implemented using an existing directory infrastructure provided, for example, by VeriSign, Inc. of Mountain View, Calif. In alternate embodiments, the public key/certificate directory 210 is implemented using a conventional database system, such as one available from SyBase, Inc. of Emeryville, Calif. In the prior example, the directory 210 may be accessible by the general public, including sender 100 and recipient 300. In the latter example, the directory 210 may be accessed only by the OC 200. Preferably, the public key/certificate directory 210 is accessed by a directory interface 201 (not shown for the sender 100 and receiver 300) using the Lightweight Directory Access Protocol ("LDAP") and is searchable by client 899 registered email address, account name, and/or OC account number. Regardless of implementation of the directory service, the OC 200 uses the public keys in the directory to authenticate clients, and provides key exchange functions for authenticated clients. Key exchange is essential so sender 100 may transparently obtain the public key of recipient 300.

In one embodiment, the OC 200 also operates the key management functions (of issuance, directory maintenance, key retrieval and exchange, key life cycle maintenance) described above. It is beneficial for the OC 200 to handle the complexities involved in key issuance, certification, storage, searching, rollover, etc. Because the OC 200 acts as a central key manager, it can implement and control the practices related to the key, such as periodically facilitating the new issuance of key pairs to maintain the integrity of keys. Also, since the OC 200 maintains the public keys/certificates, the OC 200 can perform real-time key revocation. Real-time revocation prevents communications from being sent using compromised or invalid keys. Furthermore, since the OC 200 maintains the public keys/certificates, a sender 100 needs to specify only a recipient 300's registered email address in order to obtain the recipient's public key.

In an alternate embodiment, a trusted third party or trusted third parties perform aspects of the public key/certificate management on behalf of the OC 200. For example, a trusted third party could issue and maintain digital certificates. When a sender 100 wants to send a message to a recipient 300, the OC 200 would obtain the recipient's public key certificate from the third party rather than maintaining the certificate itself. One skilled in the art will be aware that key and certificate management can be handled by trusted third parties without deviating from the spirit of this invention.

As depicted in FIG. 3, a sending system 100 facilitates the secure and reliable transmission of an electronic document 3 to the next recipient 300 on a routing list for the document using the OC 200. Software for implementing this sending system 100 can be supplied on a computer-readable medium, such as with the registration software, or can be received from the OC 200 via a network connection. As described in more detail below, the sending system 100 authenticates a sender and the OC 200, creates a reliable connection 2A between the sender 100 and the OC 200, the OC 200 identifies the next recipient 300 on the routing list, and the OC 200 provides a key or keys to the sender 100 which the sender 100 uses to secure the document 3 before it is transmitted to the recipient 300.

A sender uses the sending system 100 to send an electronic document 3 to the recipient's receiving system 300 by connecting to the OC 200 through a network connection 1A. In one embodiment, a direct line between the parties 100, 200 provides reliability and security, but direct network connections are costly and in many instances impractical.

In an alternate embodiment, the sender 100 connects to the OC 200 via a network connection 1A, such as the Internet. Once connected to the OC 200, the sender 100 begins the strong authentication (e.g. password protection plus asymmetric key authentication) process by entering her/his username and password, which the sender 100 selected as part of the registration process described above. The account profile module 101 verifies the sender 100's username and password.

If the username and password are correctly entered, the account profile module 101 grants access to the sender 100's private key and the strong authentication process 455 (FIG. 4) continues.

The sending system 100 automatically continues the strong authentication process 455 by use of an authentication module 102. Since this authentication process is automatically performed, it is transparent to the sender 100. The sender's authentication module 102 authenticates 455 the sender 100 to the OC's authentication module 202 by sending the OC 200 a digital signature generated using the sender's private key, thus proving that the sender 100 is who he claims to be.

The digital signature may be generated in many ways. In one approach, the sender simply encrypts some meaningful data using his private key and sends this to the OC 200. If the OC 200 can use the sender 100's public key to decrypt the received data package, the OC 200 knows that the sender 100 is the one who encrypted the data package.

In a second approach, the sending system 100 randomly generates some data to digitally sign. A hash algorithm creates a message digest, or hash, of the randomly generated data. A hash algorithm is a method of transforming a variable length message, in this case the randomly generated data, into a fixed length number. This fixed length number is referred to as the hash or message digest of the original message. For this message digest to be useful as part of a digital signature, the contents of the message must not be practically ascertainable from the message digest number. Thus, hash algorithms are typically one-way functions, which can easily generate a hash from a message, but which cannot, for all practical purposes, generate the original message given the hash. The message digest's usefulness as a digital fingerprint of a message also depends upon its ability to correlate uniquely to the original message. Ideally, a hash algorithm is a strictly one-to-one function so that each hash number can only be generated by one, and only one, message. Any change in the message, no matter how insignificant, will generate a different hash number. If a hash algorithm generates the same hash for two different messages, a collision exists which could compromise the usefulness of the hash. Thus, one measure of a hash algorithm's usefulness is the frequency at which more than one message will generate the same hash number. In practice, useful hash algorithms may generate collisions in theory but the probability is low enough as to be practically negligible. Well-known one-way hash algorithms that are useful for digital signing include MD2, MD5, and SHA-1.

The hash of the randomly generated data, along with information about the hash algorithm used to generate the hash, is then encrypted with the sender's private key. The sending system 100 sends the original randomly generated data as well as the encrypted hash to the OC 200. The OC 200 uses the sender's public key to decrypt the hash. The OC 200 obtains the sender's public key by searching the public key directory 210. To verify the integrity of data, the OC 200 uses the same hash algorithm on the original randomly generated data. If the hash generated by the OC 200 does not match the decrypted hash, this indicates a problem. The digital signature may not have been created with the sender's private key or the data may have been tampered with since it was signed by the sender 100. If the hashes match, the OC 200 can be reasonably assured that the sender 100 sent the message.

Once the OC 200 has strongly authenticated 455 the identity of the sender 100, the sending system 100 can optionally authenticate the identity of the OC 200. The OC 200's authentication module 202 authenticates to the sending system's authentication module 102 in a similar manner as the sender 100 was authenticated, that is, by digitally signing some randomly generated data. The sending system 100 obtains the OC 200's public key by searching the public key directory 210. Alternatively, the sending system 100 could obtain the OC 200's public key in some other manner, such as having it coded into the sending system 100.

After the mutual strong authentication, a secure connection 2A is established 460 between the parties 100,200. A direct line can provide a reliable and secure connection between the parties 100,200; however, direct lines are expensive and are not always available. In the example of FIG. 3, the secure connection 2A is established 460 by use of a virtual private network ("VPN") or an SSL connection. A VPN connection 2A could utilize protocols designed for layer 2 of the Open Systems Interconnection ("OSI") network architecture model, such as the Layer 2 Tunneling Protocol ("L2TP") or Point-to-Point Tunneling Protocol ("PPTP"). Alternately, the VPN connection 2A could be established using an OSI layer 3 protocol such as IP Security protocol ("IPSEC"). Alternatively, the VPN could be established at one of the layers in the host process subset (layers 5 through 7) of the OSI network architecture model. One benefit of establishing a VPN connection 2A at the host process subset layers is that present VPN systems employ protocols in layers 2 and 3. If the sender's computer system 100 is part of a network that already utilizes a VPN, a conflict may be created between the existing VPN and the VPN connection 2A attempting to be established 460 between the sending system 100 and the OC 200. By creating a VPN connection 2A at the host process subset layers, the sender 100 and the OC 200 can establish a VPN independent of any other VPN used by sender 100's network.

In one approach, the VPN connection 2A is created at the application level by using a session key and Hypertext Transfer Protocol ("HTTP"), Transmission Control Protocol ("TCP"), or File Transfer Protocol ("FTP"). The secure connection modules 103 and 204 establish the VPN, by performing the following functions. Either the sending system's module 103 or the OC 200's module 204 generates a session key. Once a session key has been generated, the key-generating party transmits it via the network connection IA to the other party by encrypting the session key with the receiving party's public key. For example, the sending system's secure connection module 103 generates a session key and encrypts it with the OC 200's public key. The encrypted session key is transmitted to the OC 200's secure connection module 204, which decrypts the session key. Once both parties have the session key, they communicate via a VPN connection 2A that encrypts the application data with the session key. This process allows a compatible VPN tunnel to be created regardless of existing VPN setup in the sending system 100, as described in commonly-assigned U.S. Provisional Patent Application No. 60/242,015, "Application VPN with Application Proxies," by Eng-Whatt Toh, filed 19 Oct. 2000 and commonly-assigned U.S. patent application Ser. No. 09/978,113, "Cryptographically Secure Network," by Eng-Whatt Toh, et al., filed 15 Oct. 2001, which subject matter is incorporated herein by reference in its entirety.

The VPN connection 2A has many advantages. One advantage is that data transmissions that occur over the VPN connection 2A carry additional encryption since they have been encrypted by the VPN encryption key (i.e., the session key). Second, the VPN 2A creates a reliable connection between the sender 100 and OC 200. Traditional Internet email communications are routed through several email servers, which are owned and operated by a number of parties. Since no single company or entity owns the entire delivery chain for the email, no one company or entity can guarantee reliable delivery or integrity of the message. The VPN 2A formed between the sending system 100 and the OC 200 creates a point-to-point connection and is not forwarded through any Internet email servers. This method is much more reliable than traditional Internet email and allows the OC 200 to guarantee delivery of any message regardless of message type or size. In addition, it does not create an unnecessary audit trail.

As a final example, the VPN-enabled OC 200 acts as central switch that can effectively extend the VPN connection 2A from the sending system 100 to the receiving system 300. Since a VPN connection is point-to-point, it is infeasible to produce a dynamic VPN connection that allows every possible sender 100 to create a VPN to every possible recipient 300, without having a central key manager such as the OC 200. However, this result can in effect be achieved by having the OC 200 act as a central switch between sending system 100 and receiving system 300. Each client, whether sending an electronic document or receiving one, connects to the OC 200 by forming a VPN tunnel 2A,2B. In this manner, a VPN connection 2A,2B is effectively created from the sending system 100 to the receiving system 300 via the OC 200. This structure enables the OC 200 to connect any sender 100 with any recipient 300 using a secure and reliable delivery system.

In steps 462 and 464, the OC 200 receives an indication that the sender desires to deliver the document 3 to a next stage on a routing list for the document and identifies a recipient 300 from the next stage. The term "stage" is different from "recipient." For example, each stage may include more than one recipient. The recipients may come from different organizations and may be located outside of each other's internal network (e.g., outside of each other's firewall). Thus, the document may be transmitted over the Internet between the various recipients, but still with both security and reliability. FIGS. 10A-10C depict some example routing lists.

FIG. 10A depicts a simple routing list which consists of a chain of individuals. In this routing list, the document is to be routed from individual A to B to C to D. Each individual recipient represents a different stage on the routing list. Stage 1 includes individual A, stage 2 includes B, etc. The routing list is also given an identifier, which is "list 1" in this case. Thus, if the OC 200 receives 462 an indication that sender B would like to deliver the document 510 to the next stage on routing list "list 1," the OC 200 (specifically, the routing module 209) resolves the routing list to identify 464 individual C as the next recipient since the next recipient after B is C.

If the OC 200 is tracking progress of the document along the routing list, it can also confirm that B is the current recipient of the document and that, therefore, a request from B to send the document to the next recipient is consistent with its tracking of the document. In contrast, if the OC 200's tracking indicates that A is the current recipient of the document, then a request from B to send the document to the next stage on the routing list would be inconsistent. The OC 200 would then take appropriate actions, for example declining B's request to send the document to the next stage.

FIG. 10B depicts a routing list in which some of the stages include groups of recipients. In this case, the document is to be routed from individual A (stage 1), to group B (stage 2), to group C (stage 3), to individual D (stage 4). Group B contains recipients B1, B2, ... Bn, and group C contains recipients C1, C2, ... Cn. The routing of documents to/from groups can be performed in a number of ways and is typically defined in the rules for the routing list, as is also shown in FIG. 10B.

In this example, when A is finished with the document, A forwards the document to the email address review.team@xyz.com. The OC 200 receives the indication 462 that the sending system 100 desires to send the document to the next stage. The OC 200 determines 464 that the next stage after sender A includes all recipients in group B, and eventually returns 480 or 475 the public keys required to deliver the document to all of the recipients in group B.

As each recipient in group B finishes with the document, it is routed to a corresponding member in group C. For example, when B1 is finished, he sends the document to review.team@xyz.com. Upon receiving this indication 462 from B1, the OC 200 (specifically routing module 209) determines 464 that the next recipient following sender B1 is recipient C1. In subsequent steps 475 or 480, the OC 200 returns the appropriate public key for C1. That is, the document is routed to C1 when B1 finishes, to C2 when B2 finishes, etc. Note that in this example, there are equal numbers of recipients in groups B and C. For example, the pairs B1-C1, B2-C2, etc. may represent different two-person teams which review the document in parallel.

All members of group C must finish with the document before it is routed to the final recipient D. Continuing with this example, when C1 is finished with the document, he forwards the document to review.team@xyz.com. The sending system 100 sends this indication 462 to the OC 200 that it desires to send the document to the next stage, upon which the OC 200 (specifically routing module 209) determines 464 that the next recipient is recipient D. In subsequent steps 475 or 480, the OC 200 returns the appropriate public key for D. However, the OC 200 stores 530 the delivery in the storage area 205 until all members of group C are finished, as is dictated by the rules.

For convenience, the routing list identifier "review.team@xyz.com" is an email address. Thus, senders can use the routing list by sending their document to this special email address. Emails sent to this address are routed to the routing module 209, which resolves the email address to a next recipient(s). One advantage of this approach is that conventional email servers can then support routing lists as addressees without problems.

FIG. 10C is a final example of a routing list which includes rules that embody a business process involving the sales and marketing department of a company, the company's outside law firm and external credit agencies. In this case, the rules for the routing list embody company xyz's process for approving orders from new customers. In one implementation, the rules embodying xyz's approval procedure are encapsulated as part of a routing form and provided to the routing module 209 as part of the indication to deliver document 462. The routing list is named "newsales@routinglists.xyz.com." The domain name "routinglists.xyz.com" has been set aside for routing lists.

The routing list operates as follows. A salesperson initially completes the routing form which may contain, among other information, the value of the transaction and his sales territory. The sales person sends the routing form together with a purchase order from a new customer to the routing list for approval. The first stage of the routing list is the salesperson's regional sales manager in the corporate head office, who must approve the transaction before it can advance to the next stage. Note that stage one includes a group of potential recipients since there is more than one regional sales manager. The sales person starts by sending the purchase order and the routing form to newsales@routinglists.xyz.com. The sending system 100 sends indication 462 including the routing form to the OC 200 that it desires to send the document to the next stage, upon which the routing module 209 of OC 200 determines 464 the sales manager corresponding to the sales person using information provided in the routing form. In subsequent steps 475 or 480, the OC 200 returns the appropriate public key for the sales manager. In this way, the routing form and purchase order can be securely and reliably routed to the correct regional sales manager.

Upon the sales manager's approval, the purchase order is routed to an external credit agency, which must also approve the transaction. The sales manager indicates approval by digitally signing the routing form and the purchase order, and then sends the routing form with the purchase order to newsales@routinglists.xyz.com. In an alternate embodiment, the approval is reflected in the document itself. For example, the sales manager might digitally sign only the purchase order or place a tracking code onto the purchase order. In another implementation, the approval is transmitted separately between the sales manager and the OC 200. For example, the OC 200 may query the sales manager whether he approves the purchase order.

Returning to this example, when the sales manager is ready to route the purchase order and routing form; the sending system 100 sends an indication 462 including the routing form to the OC 200 that it desires to send the purchase order to the next stage. Upon receiving the request and the routing form, the routing module 209 of OC 200 determines 464 that the digital signature on the routing form is valid and selects an individual in the credit agency as a next recipient. In one implementation, the routing module 209 selects one of the individuals according to xyz's internal rules. For example, routing module 209 may select the individual which will give the fastest response time, or the individual who is assigned to the specific sales region. In another implementation, the routing module 209 sends the purchase order to all of the qualified individuals at the credit agency but only requires one approval before moving to the next stage. Regardless of the specific method, the routing module 209 determines 464 the recipients for stage two, and subsequently returns 475 or 480 the appropriate keys for the next recipient(s).

In stage three, the purchase order and routing form are routed to both a VP level executive and xyz's law firm for separate approvals, but only if the amount of the purchase order is over $100,000. Stage three is an example of conditional recipients. The VP and law firm receive the purchase order only if certain conditions are met (if the amount is over $100,000 in this example). Whether the condition is met may be determined in a number of ways. For example, the amount of the purchase order may be transmitted with the purchase order or routing form or the OC 200 may query earlier recipients as to the amount of the purchase order. In other examples, different parameters may be transmitted with the purchase order and/or affect routing of the document. After stage three, the purchase order has been approved. It is then routed to both the accounting department and the shipping department for order fulfillment and payment collection. Note that the purchase order would go directly to stage four if the amount was less to than $100,000.

Continuing with the above example, the credit agency countersigns the routing form and the purchase order and sends them to newsales@routinglists.xyz.com. The sending system 100 sends indication 462 including the routing form to the OC 200 that it desires to send the document to the next stage. The routing module 209 verifies that the routing form has been signed by the credit agency and decides who the next recipients are depending on the transaction amount provided in the routing form. In subsequent steps 475 or 480, the OC 200 returns the appropriate public keys.

The routing lists shown in FIG. 10 are merely examples. Other types of routing lists and rules will be apparent.

Figure 4:
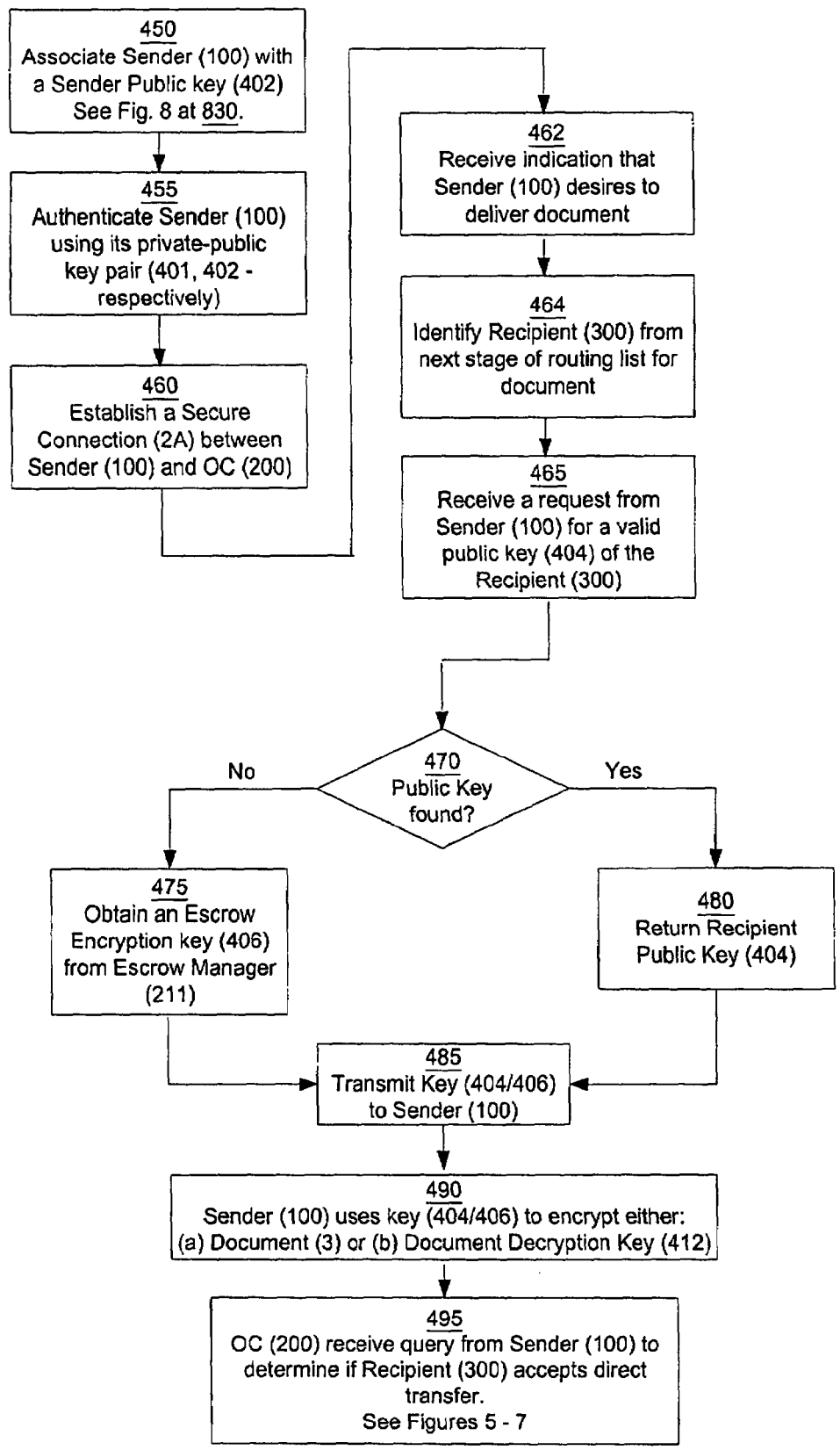
FIG. 4 is a flow diagram illustrating operation of the systems in FIGS. 1-3.

Another example rule is that different recipients receive different versions of the document, perhaps a read-only version or the document in different formats to accommodate different applications. In addition, steps 462 and 464 are shown in FIG. 4 as occurring after step 460. However, this order is not required. In an alternate implementation, the OC 200 receives 462 an indication of the sender's wish to deliver the document to the next stage on the routing list and resolves 464 the routing list to a next recipient earlier in the flow diagram (e.g., before step 460).

The indication 462 from the user may take any number of forms. For example, the OC 200 may receive the document together with the routing list through the secure connection 2A. Alternately, the sender may query the OC 200 for the next stage of the routing list. As part of the query, the sender may further provide a routing form comprising the routing rules and routing parameters that may determine who the next recipients are, as highlighted in the example of FIG. 10C.

In one implementation, the OC 200 tracks the current recipient of the document. For example, referring to FIG. 10C, tracking of the purchase order might indicate that purchase order #1234 currently resides with the regional sales manager for the Northeast region. The OC 200 then responds to the sender's query for the next stage of the routing list by returning the identity of a next recipient from the routing list if the querying sender is the current recipient (i.e., if the querying sender is the Northeast region sales manager). On the other hand, the OC 200 sends an error message if it cannot resolve the query (e.g., if the routing list for the document cannot be located or if the querying sender is not the Northeast region sales manager). In one approach, the OC 200 waits until it receives confirmation that the next recipient has received the document before updating its tracking of the document. Continuing the above example, the OC 200 would wait for confirmation of receipt from the credit department before changing the current recipient from the regional sales manager to the credit department.

Routing lists may also be set up in a number of ways. For example, a routing list may be defined a priori (i.e., before anyone actually tries to use the routing list) and then stored for subsequent use. The routing list in FIG. 10C is a good candidate for this approach since it is rather complicated (both in terms of lists of recipients and the rules governing the routing list) and likely would require multiple approvals within company xyz before it could be established. On the other hand, the routing lists in FIGS. 10A-10B are simple enough that they could be defined by the first sender who wishes to use the routing list. In one implementation, the originating sender sends the routing list along with its indication to deliver a document to the routing list. The OC 200 receives the routing list in order to process the document. The OC 200 may also store the routing list for subsequent use. Once the routing list is set up, the routing module 209 of OC 200 can securely route deliveries by returning the correct public keys for the next recipient(s) on the routing list. It can determine the next recipient(s) in a number of ways, including using information provided in a routing form and/or by tracking the current recipient along a routing list.

Returning to FIG. 4, once the secure tunnel 2A is formed between the sending system 100 and the OC 200, the sending system 100 obtains the recipient 300's public key. In one implementation, the sender 100 sends the delivery 510 to the OC 200 through the secure tunnel 2A. This could serve as the indication 462 to deliver the document. In this implementation, the OC 200 encrypts the delivery 510 using the selected recipient 300's public key and proceeds with step 535 (to be described later). This implementation is advantageous in that the sending system 100 is simpler and smaller with reasonable security since the delivery 510 is protected by the secure tunnel 2A. However, this does not provide end-to-end security or digital signatures.

In a preferred implementation, the OC 200 resolves 464 the routing list and returns the identity of the next recipient 300 to the sending system 100. The sending system 100 can then obtain the recipient 300's public key by searching the public key directory 210. Alternatively, the sending system 100 queries 465 the OC 200 for the recipient 300's public key 404. Alternatively, the OC 200 resolves the routing list 464 and returns 465 the recipient 300's public key 404 all in one step. The routing module 209 resolves the routing list and a directory interface 201 obtains 480 the recipient 300's public key 404 from the public key directory 210, which is transmitted 485 to the sending system 100 via the secure connection 2A, typically in the form of a digital certificate from the public key directory 210. The key management module 205 monitors the public keys to ensure that the OC 200 returns to the sending system 100 the recipient 300's current public key 404.

The foregoing explanation assumed that the recipient 300 has a valid public key 404. The recipient 300 may not have a valid public key, for example, if the recipient 300 has not registered with the OC 200 prior to the sending system 100 transmitting the document 3, or if the recipient 300's public key has been revoked for some reason. In either case, when the sending system 100 requests 465 the recipient 300's public key, none will exist. To solve this problem, the OC 200 and/or the escrow manager 211 can securely hold the message in escrow until the recipient 300 registers with the OC 200 or until a new public-private key pair is generated. When the sending system 100 requests 465 the recipient 300's public key and none is found in the public key directory 210, the escrow manager 211 provides 475 an escrow encryption key 406, which is transmitted 485 to the sending system 100.

Whether the sending system 100 receives the recipient's public key 404 or an escrow encryption key 406, the sending system 100 uses the key 404 or 406 to secure the document 3. In one embodiment, the sending system's encryption module 104 encrypts 490 the document 3 using whichever key 404 or 406 was transmitted 485 to it. Alternatively, instead of encrypting the document with the public key 404 or escrow encryption key 406, the sending system's encryption module 104 could encrypt the document 3 using other cryptographic standards, for example, Public Key Cryptography Standard #7. That is, the sending system 100 uses a document encryption key 410 to encrypt the document 3, and uses the escrow encryption key 406 or recipient public key 404 to encrypt a document decryption key 412. The document encryption key 410 is a key, preferably generated by the sending system 100, which the sending system 100 uses to encrypt the document 3. Preferably, the document encryption key 410 is a symmetric key (in which case the document encryption key 410 and the document decryption key 412 are the same key) because of its reduced time requirements needed for the encryption/decryption process as compared to asymmetric keys. But alternatively, the document encryption key 410 could be an asymmetric key. In the case of an asymmetric document encryption key 410, the sending system 100 will encrypt the document 3 with the document encryption key 410 and will include the document decryption key 412 encrypted with the recipient's public key 404 or encrypted with the escrow encryption key 406 as part of the delivery 510. In either case, the escrow encryption key 406 or the recipient's public key 404 is used for encrypting 490 the document decryption key 412 rather than encrypting the document 3.

The delivery 510 to be transmitted to the recipient 300 comprises at least the encrypted document 3. The delivery may also include an encrypted document decryption key 412, if a document encryption key 410 was used to encrypt the document 3. If an escrow encryption key 406 was employed by the sending system 100, the OC 200 or escrow manager 211 may also include the escrow decryption key 407 as part of the delivery 510 although this generally is not recommended. The delivery 510 can also include addition data. For example, the delivery 510 can include a cover letter or message, the header information of an email message (for example, the sender 100 and the recipient 300 names or aliases, email addresses of the sender and the recipient, message "Re:" data, and so forth), and tracking information, such as a unique tracking number. The delivery can also include one or more message digests, such as a message digest of the document 3, and one or more digital signatures, such a digital signature of the sender 100. The message digests and/or digital signatures allow for sender authentication, non-repudiation, and message integrity. For example, the document 3 can be digitally signed. The digital signature allows for sender authentication. The digital signature can be generated in a similar manner as described above during the authentication phase. Alternatively, the sending system 100 can digitally sign the document 3. In another alternative, the contents of the document 3 are mathematically hashed using a one-way hash function to create a message digest or hash number. The hash number is then encrypted using the sender 100's private key 401. This encrypted hash number serves two functions. First, it functions as a digital signature. Second, the hash number can be used to verify that the document 3 was not altered during transmission. Once the receiving system 300 receives and decrypts the document 3 and the hash (if it was sent in encrypted form), the receiving system 300 hashes the document 3. If the hash numbers match, then the document 3 was not altered. This latter embodiment allows for non-repudiation by the sender 100 because the document 3 arrived signed and unaltered. The above-mentioned items can be encrypted in the same manner as the document 3 and delivered as part of the delivery 510. Transmission of the delivery 510 to the recipient 300 can occur in a number of ways, which will be detailed below.

Figure 5:
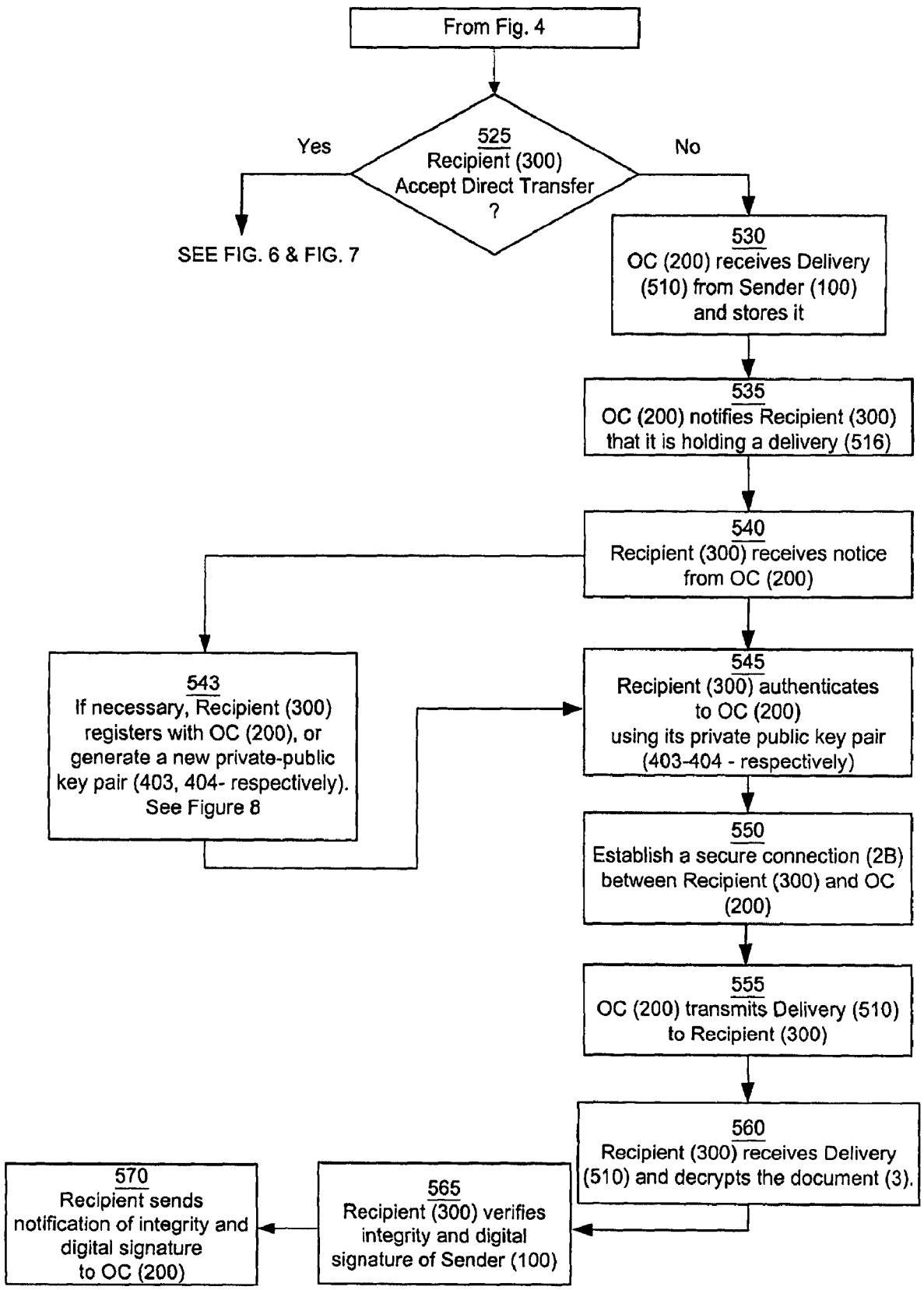
FIG. 5 is a flow diagram illustrating operation of the systems in FIGS. 1-3 in which the delivery (510) is sent via the OC (200)

Referring now to FIG. 3 and FIG. 5, if the recipient 300 does not accept 495, 525 direct transfer of the delivery 510, the OC 200 can act as a staging area for the delivery 510. The OC 200 receives 530 the delivery 510 from the sending system 100 via the first secure connection 2A. The OC's messaging module 203 receives the delivery 510, and the OC 200 stores 530 the delivery 510 in a storage area 206.

The OC 200 notifies 535 the recipient 300 that a delivery 510 has been addressed to the recipient 300 and awaits transmission pending secure connection with the OC 200. The recipient 300 could be notified by email, facsimile, telephone, courier or mail service, or the like. In the embodiments in which an escrow encryption key 406 is used as part of the delivery 510 encryption process, before the recipient can receive the delivery 510 from the OC 200, the recipient 300 must register 543 with the OC 200 and provide an existing key-pair or must generate 543 a new key pair. The registration of the recipient 300 occurs in the same manner as described above for the client 899 (see FIG. 8). To generate a new key pair, the key manager module 205 prompts the key registration module 305 to generate a new private-public key pair (403, 404—respectively). The public key 404 is transmitted to the OC 200, is associated with the recipient 300, and is stored in the public key directory 210 for use with future deliveries. The recipient account profile 301 is updated to include the current private key 403. In the embodiments in which the recipient had a valid public key 404 which was used as part of the delivery 510 encryption process, the recipient 300 can proceed to receive the delivery 510 from the OC 200.

With its valid key pair 403, 404, the recipient 300 can obtain the delivery 510 from the OC 200. The recipient 300 accesses its private key 403 stored in the account profile module 301, such as by entering an account name and password, and connects to the OC 200 via a network connection 1B. In the same manner as discussed above for the sending system 100, the receiving system 300 strongly authenticates 545 to the OC 200 and, optionally, the OC 200 strongly authenticates to the receiving system 300. As with the sending system 100, a secure connection 2B, such as an SSL connection or a point-to-point VPN tunnel, is formed 550 between the OC 200 and receiving system 300. The receiving system 300 can then request the delivery 510. The OC 200's messaging module 203 transmits 555 the delivery 510 from the OC 200's storage area 206 to the receiving system 300 via the secure connection 2B. The receiving system's encryption/decryption module 304 decrypts 560 the document 3 to return it to an intelligible form.

The process of decrypting 560 the document 3 depends upon the method employed by the sending system 100. If the sending system 100 encrypted the document 3 with the recipient's public key 404, the receiving system 100 decrypts the document 3 using the recipient's private key 403. If the sending system 100 encrypted the document 3 using a document encryption key 410, the receiving system 300 uses its private key 403 to decrypt the document decryption key 412 and then uses the document decryption key 412 to decrypt the document 3.

In the embodiments in which an escrow encryption key 406 was used by the sending system 100, the OC 200 or escrow manager 211 could transmit 555 the escrow decryption key 407 as part of the delivery 510 to the receiving system 300. Alternatively, the OC 200 or escrow manager 211 could decrypt the document 3 and re-encrypt it with the recipient 300's public key 404 prior to transmitting 555 it to the recipient 300. In another embodiment, the sending system 100 uses a document encryption key 412 to encrypt the document 3. The sending system 100 encrypts the document decryption key 412 using the escrow encryption key 406, which could represent the escrow manager's public key, which the sending system 100 obtains from one of the following: its own encryption module 104, the public key directory 210, the OC 200, and the escrow manager 211. The sending system 100 transmits the encrypted document 3 and the encrypted document decryption key 412 to the OC 200 or the escrow manager 211 as the delivery 510. When the recipient 300 requests the delivery 510, the OC 200 or escrow manager 211 decrypts the document decryption key 412 using the escrow decryption key 407, which could represent the escrow manager's private key, and re-encrypts the document decryption key 412 with the recipient 300's public key 404. Then, the escrow manager 211 or OC 200 messaging module 203 sends the delivery 510, which includes the re-encrypted document decryption key 412 to the receiving system 300. The receiving system 300 then decrypts the document decryption key 412 with its private key 403 and uses that key 412 to decrypt the document 3.

For examples of key escrow systems, see commonly-assigned U.S. Provisional Application Ser. No. 60/242,014, "Method For Fast Escrow Delivery," by Chee-Hong Wong, Kok-Hoon Teo, See-Wai Yip, and Eng-Whatt Toh, filed 19 Oct. 2000, and commonly-assigned U.S. patent application Ser. No. 09/332,358, "Simplified Addressing for Private Communications," by Eng-Whatt Toh and Eng-Toh Sim, filed 10 Jun. 1999, which subject matter is incorporated herein by reference in its entirety.

The decryption module 304 can also decrypt (if encrypted) and verify 565 the digital signature and message digests, if those items are included with the delivery 510. In order to verify the digital signature, the decryption module 304 uses the sender 100's public key. The decryption module can obtain the sender 100's public key by accessing the public key directory 210, by receiving it as part of the delivery 510, or by requesting the public key from the OC 200. The OC 200 can retain the sender 100's public key from the authentication processes with the sending system 100; or alternatively, the OC 200 can obtain the sender 100's public key by searching the public key database 210. The receiving system 300 could also optionally notify 570 the OC 200 of the results of the verification of the integrity and/or digital signatures.

Figure 6:
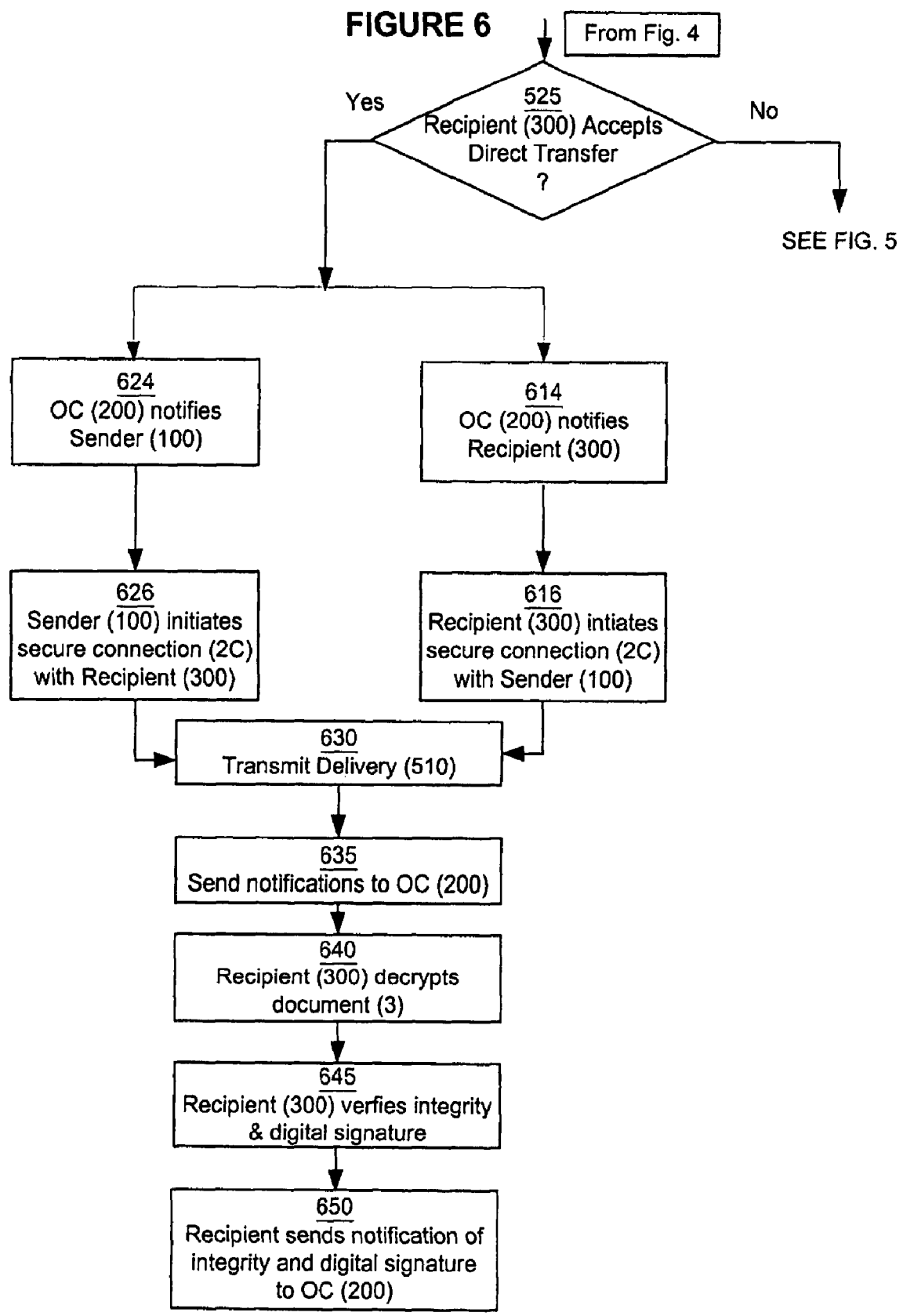
FIG. 6 is a flow diagram illustrating operation of the systems in FIGS. 1-3 and 9, in which the sender (100) and the recipient (300) establish a direct and secure connection (2C) between them.
Figure 7:
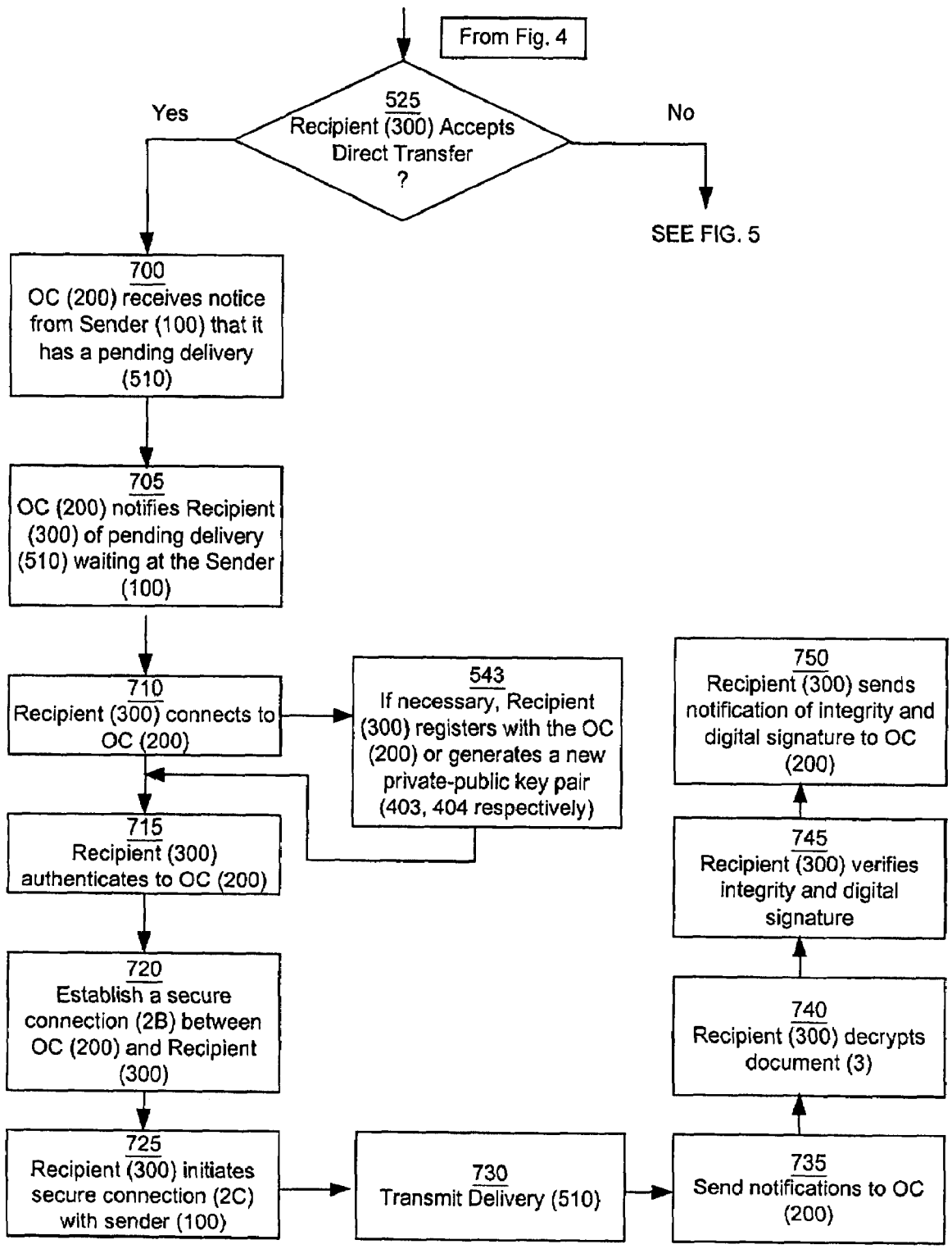
FIG. 7 is a flow diagram illustrating operation of the systems in FIGS. 1-3 and 9, in which the sender (100) and the recipient (300) establish a direct and secure connection (2C) between them.

In FIGS. 6 and 7, alternate embodiments are depicted in which the receiving system 300 accepts 525 direct transfer. In the previous embodiments, the entire delivery 510 was sent via the OC 200. In the alternate embodiments of FIGS. 6 and 7, the delivery 510, or a large portion 505 (See FIG. 9) of it, is sent directly from the sending system 100 to the receiving system 300 rather than via the OC 200. These embodiments are advantageous because they reduce the volume of data that flows through the OC 200. As with the previous embodiments, the OC 200 still acts as a central key manager by providing the keys necessary to ensure proper authentication, secure connection setup, encryption, and the like.

FIG. 6 depicts peer-to-peer embodiments wherein the sending system 100 transmits the delivery 510 directly to the receiving system 300 via a direct and secure connection 2C (FIG. 9), such as a peer-to-peer VPN connection or SSL connection. For example, the sending system 100 queries 525 the OC 200 to ascertain the receiving system 300's identity (from resolution of the routing list) and to determine if the receiving system 300 accepts direct transfers. The OC 200 can determine if the receiving system 300 is available to accept a direct delivery by, for example, determining if the receiving system 300 is presently connected to the OC 200. If the receiving system 300 is available to accept a direct delivery and is connected to the OC 200, the sending system 100 is notified 624 by the OC 200 and initiates 626 a secure connection 2C between the sending system 100 and the receiving system 300. Preferably, the secure connection 2C is an SSL connection or a peer-to-peer VPN connection. Alternatively, the OC 200 could notify 614 the recipient 300 that the sender 100 has a delivery 510 pending, and the receiving system 300 initiates 616 a secure connection 2C with the sending system 100.

With the direct and secure connection 2C established, the sending system 100 transmits 630 the delivery 510 to the receiving system 300. Optionally, the OC 200 exchanges acknowledgements 635 with sending and receiving systems 100, 300 that transfer 630 of the delivery 510 was successful. These acknowledgements could include acknowledgements of the tracking items discussed below.

With the delivery 510 transferred to the receiving system 300, the receiving system's encryption/decryption module 304 decrypts 640 the document 3. Optionally, the delivery 510 or document 3 integrity is verified 645, as well as verification of any digital signatures which were included as part of the delivery 510. The receiving system 300 could also optionally notify 650 the OC 200 of the results of the verification of the integrity and/or digital signatures.

If the receiving system 300 does not accept direct deliveries or is otherwise unavailable to presently accept the delivery 510, the sending system 100 has at least two options. The first option is the set of embodiments described above with reference to FIG. 5. Thus, the sending system 100 sends all of the delivery 510 via the OC 200, as previously described. Alternatively, the sender 100 can notify the recipient 300 that the sender has a delivery 510 which the sender 100 wishes to transmit via a direct and secure connection 2C. The recipient 300 can then connect to the sender 100 when it is ready to do so.

FIG. 7 depicts an embodiment for sending the delivery 510 via a direct and secure connection 2C (FIG. 9), such as a peer-to-peer VPN connection or SSL connection, when the receiving system 300 will accept direct transfer but is not presently available to receive the delivery 510. The sending system 100 notifies 700 the OC 200 that the sending system 100 has a delivery 510 for the receiving system 300. The OC 200 notifies 705 the recipient 300 that the sender 300 has a pending delivery 510. The recipient connects 710 to the OC. If necessary, the recipient 300 registers 543 with the OC 200, as explained above in reference to FIG. 8, or generates 543 a new private-public key pair 403,404—respectively, which has also been detailed above in reference to FIG. 5.

With its valid key pair, the recipient strongly authenticates 715 to the OC 200. Optionally, the OC 200 can authenticate to the receiving system 300. A secure connection 2B is established 720 between the receiving system 300 and the OC 200. The receiving system 300 initiates a secure connection 2C between itself and the sending system 100. With the secure peer-to-peer connection 2C established, the receiving system 300 retrieves the delivery 510 from the sending system 100. Optionally, the OC 200 exchanges acknowledgements 735 with sending and receiving systems 100,300 that the delivery transmission was successful. These acknowledgements could also include acknowledgements of the tracking items discussed below.

With the delivery 510 transferred 730 to the receiving system 300, the receiving system's encryption/decryption module 304, decrypts 740 the document 3. Optionally, the delivery 510 or document 3 integrity is verified 745, as well as verification of any digital signatures which were included as part of the delivery 510. The receiving system 300 could also optionally notify 750 the OC 200 of the results of the verification of the integrity and/or digital signatures.

Figure 9:
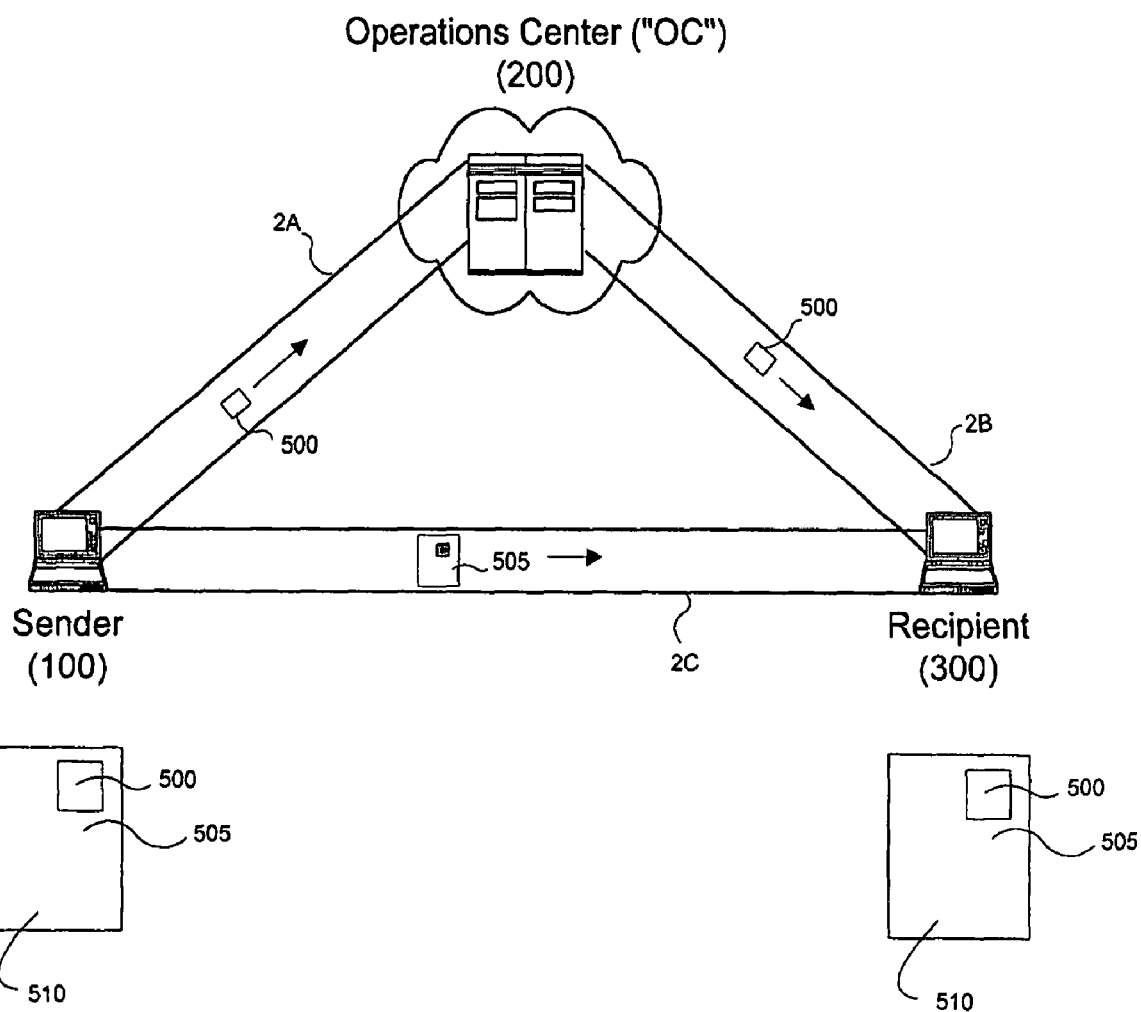
FIG. 9 is a schematic representation of a sender (100) transmitting a delivery (510) to a recipient (300) by transmitting at least a portion of the delivery (500) via an OC (200) and the remainder of the delivery (505) via a secure connection (2C) with the recipient (300)

As graphically depicted in FIG. 9, alternative embodiments of the above peer-to-peer embodiments involve at least a portion of the delivery 500, such as a packet, the header information, the last byte of the delivery 510, or the decryption key or keys required to decrypt the delivery 510 or the document 3, being sent via the OC 200. The portion of the delivery 500 can be any portion of the delivery 510, recalling that the delivery includes at least the document 3, but which could also include additional data as explained previously.

The embodiments described above in reference to FIG. 6 and FIG. 7 can be readily adapted so that a portion of the delivery 500 is sent via the OC 200, and the remainder of the delivery 505 is transmitted directly from the sender 100 to the recipient 300 via a direct and secure connection 2C. For example, the query 495 received by the OC 200 from the sending system 100 could include the small portion of the delivery 500 that is necessary to complete or to open the delivery 510. For example, the OC 200 can transmit this portion of the delivery 500, with the notice to the recipient 300 of the pending delivery, such as at step 614 or 705. Furthermore, the OC 200 could also transmit the portion of the delivery 500 prior to the recipient 300 receiving the remaining portion of the delivery 505, or the OC could transmit portion of the delivery 500 after the recipient 300 has acknowledged receiving the remaining portion of the delivery 505, such as at step 635,735.

These embodiments are advantageous because the OC 200 does not need to rely entirely on the notifications/acknowledgments 635,735 sent by the sending system 100 and receiving system 300 to track the transmission of the delivery 510. Because a portion of the delivery 500 is sent via the OC 200, the OC 200 can track and time-stamp the portion of the delivery 500 just as it would track the delivery 510, if the entire delivery 510 were transmitted via the OC 200. The OC's 200 involvement in transmitting the portion of the delivery 500 mitigates problems when the notifications of the transmission and receipt of the delivery 510 are altered or not sent by either the sending or receiving systems 100,300 respectively. With the OC 200 at least partially involved in the transmission of the delivery 510, neither party 100,300 can repudiate the delivery 510 and the tracking.

As mentioned above, in addition to securely and reliably transmitting the delivery from the sender 100 to the recipient 300, the above embodiments can also include delivery 510 tracking and notification. Tracking features are implemented by the tracking module 208 and include, for example, time-stamping the document 3 at main points throughout the delivery process. The main points through the delivery process could include the time at which the delivery 510, or a portion of it 500, was transmitted to the OC 200 or the escrow manager 211; the time at which the recipient 300 received the delivery 510, or any portion 500,505 of it; and the time at which the recipient 300 successfully decrypted the document 3. For example, when the sending system 100 transmits the delivery 510, or any portion thereof 500, to the OC 200, a tracking module 208 assigns a unique tracking number to the delivery 510, or any portion thereof 500, and time stamps it. The tracking module 208 then tracks the delivery 510, or any portion thereof 500, throughout the delivery process. Tracking information can also be used to update the OC 200's record of which recipient on a routing list for a document is the current recipient.

Another feature that can be performed by the OC 200 is the notification process. For example, the OC 200 can notify the recipient 300 that a delivery 510 has been received or is pending at the sender 100. Once the delivery 510 has been transmitted to the OC 200 or to the escrow manager 211, the messaging module 203 notifies the recipient 300 that a delivery 510, or at least a portion of the delivery 500, has been received. In an alternate embodiment, the messaging module 203 alerts the recipient 300 of the waiting delivery 510, or any portion thereof 500,505, by email notification, using for example, the email address supplied during the registration process. However, those skilled in the art will recognize that other notification systems and methods could be used without departing from the spirit of the invention. For example, the receiving system 300 may include a notification client (not shown) that receives user datagram protocol ("UDP") notifications from the messaging module 203. Upon receipt of UDP notifications, the notification client generates an audible or visual desktop notification, such as a chime, a blinking icon, a pop-up dialog box, or the like. Other forms of notification could include voice notification via a voice synthesis module, a pager notification, or a facsimile notification.

The sender 100 can likewise obtain notification. For example, the sender 100 can be notified that a notice was sent to the recipient 300. Additional notifications can include notifying the sender 100 that the recipient 300 has received the delivery 510 or the at least portion of the delivery 500. The sender 100 could also be notified that the recipient 300 has decrypted the document 3. If a delivery 510, or portion of the delivery 500, was delivered to the OC 200 and remained there for a set time period, for example thirty (30) days, and was never requested by the recipient 300 to be delivered, a notification to the sender 100 can be sent to indicate that the delivery 510, or portion thereof 500, was never requested. Finally, a notification could be sent to the sender 100 indicating that the OC 200 was unable to transmit the delivery 510, or the at least a portion of the delivery 500, to the recipient 300. The sending system 100 could receive notification in the same manner as was described above for the receiving system 300.

Each of the above notifications can be time stamped by the OC 200 to provide not only notice but also timing information. The tracking and notification features, including the time stamping, allows for further non-repudiation because both the sender 100 and the recipient 300 can track the delivery 510 throughout its transmission. These features also support the reliability of the present invention. Alternative embodiments could use other notification and tracking features.

The above description is included to illustrate the operation of the preferred embodiments and is not meant to limit the scope of the invention. The scope of the invention is to be limited only by the following claims. From the above discussion, many variations will be apparent to one skilled in the art that would be encompassed by the spirit and scope of the present invention.

What is claimed is:

1. A method for facilitating a secure delivery of a document over a network from a sender to a next stage on a routing list, the method comprising the steps of:

receiving an indication that a sender desires to deliver a document to a next stage on a routing list for the document;

identifying a recipient from the next stage of the routing list;

sending an inquiry to a public key database to determine whether the recipient has a public key listed in the public key database;

receiving a response to said inquiry, said response selected from the group of said recipient having a public key in said database and said recipient not having a public key in said database;

if said response is said recipient having a public key in said public key database, completing the steps of:
 (a) retrieving said public key from said public key database;
 (b) setting a message encryption key for encrypting the document equal to said public key;
 (c) encrypting the document prior to sending said document using the message encryption key; and
 (d) sending the encrypted document to the recipient;

if said response is said recipient not having a public key in said public key database, completing the steps of:
 (a) providing an escrow encryption key not equal to the recipient's public key and not equal to the sender's private key, wherein an escrow unencryption key for unlocking said escrow encryption key is not made available to said recipient or to the sender and
 (b) encrypting the document using the generated escrow encryption key, and storing the escrow key encrypted document in escrow;
 (c) notifying the recipient of the document stored in escrow; and
 (d) only in response to receiving an acknowledgement from the recipient, unencrypting the escrow encryption key encrypted document using the escrow unencryption key and re-encrypting the document using a document encryption key prior to sending said document to the recipient, wherein neither the escrow encryption key or the escrow unencryption key is provided to the recipient.

2. The method of claim 1 comprising the additional step of verifying the identity of the recipient after receiving the acknowledgement from the recipient and prior to unencrypting the document using the escrow unencryption key.

3. The method of claim 1 wherein the document is unencrypted using the escrow unencryption key prior to sending the document over a network to the recipient.

4. The method of claim 1 wherein the escrow encryption key is one of a public and private key not assigned to the recipient.

5. The method of claim 4 wherein the escrow encryption key is one of a public and private key not assigned to the sender.

6. A method for facilitating a secure delivery of a document over a network from a sender to a recipient, the method comprising the steps of:

receiving an indication that the sender desires to deliver a document to the recipient for the document;

sending an inquiry to a public key database to determine whether the recipient has a public key listed in the public key database;

receiving a response to said inquiry, said response selected from the group of said recipient having a public key in said database and said recipient not having a public key in said database;

if said response is said recipient having a public key in said public key database, completing the steps of:
 (a) retrieving said public key from said public key database;
 (b) setting a message encryption key for encrypting the document equal to said public key;
 (c) encrypting the document prior to sending said document using the message encryption key; and
 (d) sending the encrypted document to the recipient;

if said response is said recipient not having a public key in said public key database, completing the steps of:
 (a) providing an escrow encryption key not equal to the recipient's public key and not equal to the sender's private key, wherein a respective escrow unencryption key for unlocking said escrow encryption key is not made available to said recipient or to the sender;
 (b) encrypting the document using the generated escrow encryption key and storing the escrow key encrypted document in escrow;
 (c) notifying the recipient of the document stored in escrow; and
 (d) only in response to receiving an acknowledgement from the recipient, unencrypting the escrow encryption key encrypted document using the escrow unencryption key prior to sending said document; and
 (e) re-encrypting the escrow unencryption key unencrypted document using an encryption not equal to the escrow encryption key or a public or private encryption key of recipient;

and wherein the escrow encryption key is not provided to the recipient.

7. The method of claim 6, including the step of sending the document to the recipient in a secured state by encrypting the document.

8. The method of claim 6, including the step of sending the document to the recipient in a secured state by sending the document over a secure socket layer.

9. The method of claim 6, including the step of sending the document to the recipient in a secured state by encrypting the document and by sending the document a virtual private network.

10. The method of claim 6 wherein the recipient is on a next stage of a routing list for the document.

11. The method of claim 6 wherein the document encryption does not utilize a public private key pair.

12. A method for facilitating a secure delivery of a document over a network from a sender to a recipient, the method comprising the steps of:
   receiving an indication that a sender desires to deliver a document to a recipient for the document;
   sending an inquiry to a public key database to determine whether the recipient has a public key listed in the public key database;
   receiving a response to said inquiry, said response selected from the group of said recipient having a public key in said database and said recipient not having a public key in said database;
   if said response is said recipient having a public key in said public key database, completing the steps of:
      (a) retrieving said public key from said public key database;
      (b) setting a message encryption key for encrypting the document equal to said public key;
      (c) encrypting the document prior to sending said document using the message encryption key; and
      (d) sending the message encryption key encrypted document to the recipient;
   if said response is said recipient not having a public key in said public key database, completing the steps of:
      (a) providing an escrow encryption key not equal to the recipient's public key and not equal to the sender's private key, wherein an escrow unencryption key for unlocking said escrow encryption key is not made available to said recipient and
      (b) encrypting the document using the generated escrow encryption key, and storing the escrow key encrypted document in escrow;
      (c) notifying the recipient of the document stored in escrow; and
      (d) only in response to receiving an acknowledgement from the recipient, unencrypting the escrow encryption key encrypted document using the escrow unencryption key prior to sending said document to the recipient; and
      (e) sending the document to the recipient in a secured state by encrypting the document or by sending the document over one of the group of a secure channel, a secure socket layer or a virtual private network.

13. The method of claim 12 wherein the recipient is listed on a stage of a routing list for the document.

14. The method of claim 12 including encrypting the document with a document encryption key prior to sending the document to the recipient; wherein the document encryption key is not equal to the escrow encryption key or a public or private recipient key.

15. The method of claim 12 wherein the document encryption key is not a part of a public private key pair.

16. The method of claim 12 wherein the document encryption key is a symmetric key.

17. The method of claim 12, including the step of sending the document to the recipient in a secured state by encrypting the document.

18. The method of claim 12, including the step of sending the document to the recipient in a secured state by encrypting the document and by sending the document over a secure socket layer.

19. The method of claim 12, including the step of sending the document to the recipient in a secured state by encrypting the document and by sending the document over a virtual private network.

* * * * *